US012634002B2

(12) United States Patent
Rico Alvarino et al.

(10) Patent No.: US 12,634,002 B2
(45) Date of Patent: May 19, 2026

(54) MULTIPOINT TRANSMISSION FOR NON-TERRESTRIAL NETWORKS

(71) Applicant: QUALCOMM Incorporated, San Diego, CA (US)

(72) Inventors: Alberto Rico Alvarino, San Diego, CA (US); Le Liu, San Jose, CA (US); Xiao Feng Wang, San Diego, CA (US); Peter Gaal, San Diego, CA (US); Mostafa Khoshnevisan, San Diego, CA (US); Chiranjib Saha, San Diego, CA (US); Harikumar Krishnamurthy, San Diego, CA (US); Ayan Sengupta, San Diego, CA (US); Umesh Phuyal, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/312,572

(22) Filed: May 4, 2023

(65) Prior Publication Data

US 2024/0372609 A1 Nov. 7, 2024

(51) Int. Cl.
*H04B 7/185* (2006.01)
*H04L 5/00* (2006.01)
(Continued)

(52) U.S. Cl.
CPC ....... *H04B 7/18563* (2013.01); *H04L 5/0051* (2013.01); *H04W 56/0015* (2013.01); *H04W 84/06* (2013.01)

(58) Field of Classification Search
CPC ............. H04B 7/18563; H04L 5/0051; H04W 56/0015; H04W 84/06
See application file for complete search history.

(56) References Cited

U.S. PATENT DOCUMENTS

2019/0037338 A1* 1/2019 Edge ........................ H04W 4/02
2022/0104233 A1* 3/2022 Jeon ...................... H04L 5/0051
(Continued)

OTHER PUBLICATIONS

International Search Report and Written Opinion—PCT/US2024/ 026817—ISA/EPO—Sep. 30, 2024.
(Continued)

*Primary Examiner* — Jackie Zuniga Abad
(74) *Attorney, Agent, or Firm* — Holland & Hart LLP/Qualcomm

(57) ABSTRACT

This disclosure provides systems, methods and apparatus for enabling multi-TRP transmission in non terrestrial networks. In one aspect, a user equipment receives a first reference signal from a first satellite transmission reception point (TRP) at a first timing and receives a second reference signal from a second satellite TRP at a second timing. The first timing is synchronized with the second timing at a first geographic location. The user equipment receives a third reference signal from the first satellite TRP at a third timing and receives a fourth reference signal from the second satellite TRP at a fourth timing. The third timing and the fourth timing are synchronized at the user equipment. The user equipment receives an indication of a timing offset of the fourth reference signal with respect to the second reference signal and uses the third and fourth reference signals as a quasi colocation (QCL) source.

18 Claims, 16 Drawing Sheets

(51) Int. Cl.
     _H04W 56/00_         (2009.01)
     _H04W 84/06_         (2009.01)

(56)                    References Cited

U.S. PATENT DOCUMENTS

2022/0248358 A1* 8/2022 Laddu ................. H04W 56/001
2023/0358843 A1* 11/2023 Ghimire ............. H04W 12/104
2023/0408706 A1* 12/2023 Rusek ..................... G01S 19/38

OTHER PUBLICATIONS

Qualcomm Incorporated: "Impacts on RRM to Support FR2 Multi-Rx Chain Based 4 layer DL Reception from Multi-TRP", 3GPP TSG-RAN WG4 Meeting # 104bis-e, R4-2216866, 3rd Generation Partnership Project, Mobile Competence Centre, 650, Route Des Lucioles, F-06921 Sophia-Antipolis Cedex, France, vol. RAN WG4, No. Electronic Meeting, Oct. 10, 2022-Oct. 19, 2022, Sep. 30, 2022, 8 Pages, XP052268242, the whole document.

* cited by examiner

Figure 10:
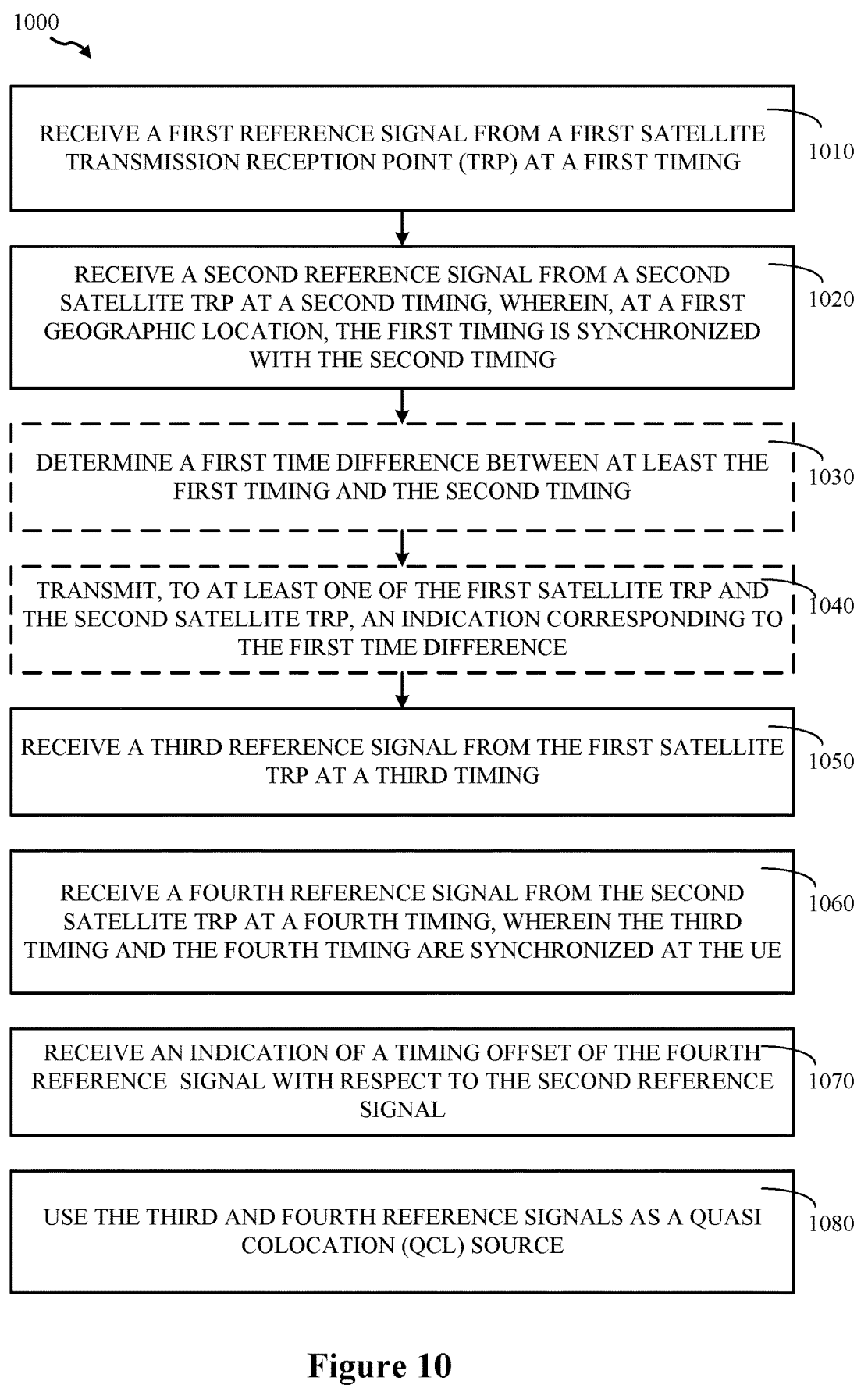

1000

RECEIVE A FIRST REFERENCE SIGNAL FROM A FIRST SATELLITE TRANSMISSION RECEPTION POINT (TRP) AT A FIRST TIMING — 1010

RECEIVE A SECOND REFERENCE SIGNAL FROM A SECOND SATELLITE TRP AT A SECOND TIMING, WHEREIN, AT A FIRST GEOGRAPHIC LOCATION, THE FIRST TIMING IS SYNCHRONIZED WITH THE SECOND TIMING — 1020

DETERMINE A FIRST TIME DIFFERENCE BETWEEN AT LEAST THE FIRST TIMING AND THE SECOND TIMING — 1030

TRANSMIT, TO AT LEAST ONE OF THE FIRST SATELLITE TRP AND THE SECOND SATELLITE TRP, AN INDICATION CORRESPONDING TO THE FIRST TIME DIFFERENCE — 1040

RECEIVE A THIRD REFERENCE SIGNAL FROM THE FIRST SATELLITE TRP AT A THIRD TIMING — 1050

RECEIVE A FOURTH REFERENCE SIGNAL FROM THE SECOND SATELLITE TRP AT A FOURTH TIMING, WHEREIN THE THIRD TIMING AND THE FOURTH TIMING ARE SYNCHRONIZED AT THE UE — 1060

RECEIVE AN INDICATION OF A TIMING OFFSET OF THE FOURTH REFERENCE SIGNAL WITH RESPECT TO THE SECOND REFERENCE SIGNAL — 1070

USE THE THIRD AND FOURTH REFERENCE SIGNALS AS A QUASI COLOCATION (QCL) SOURCE — 1080

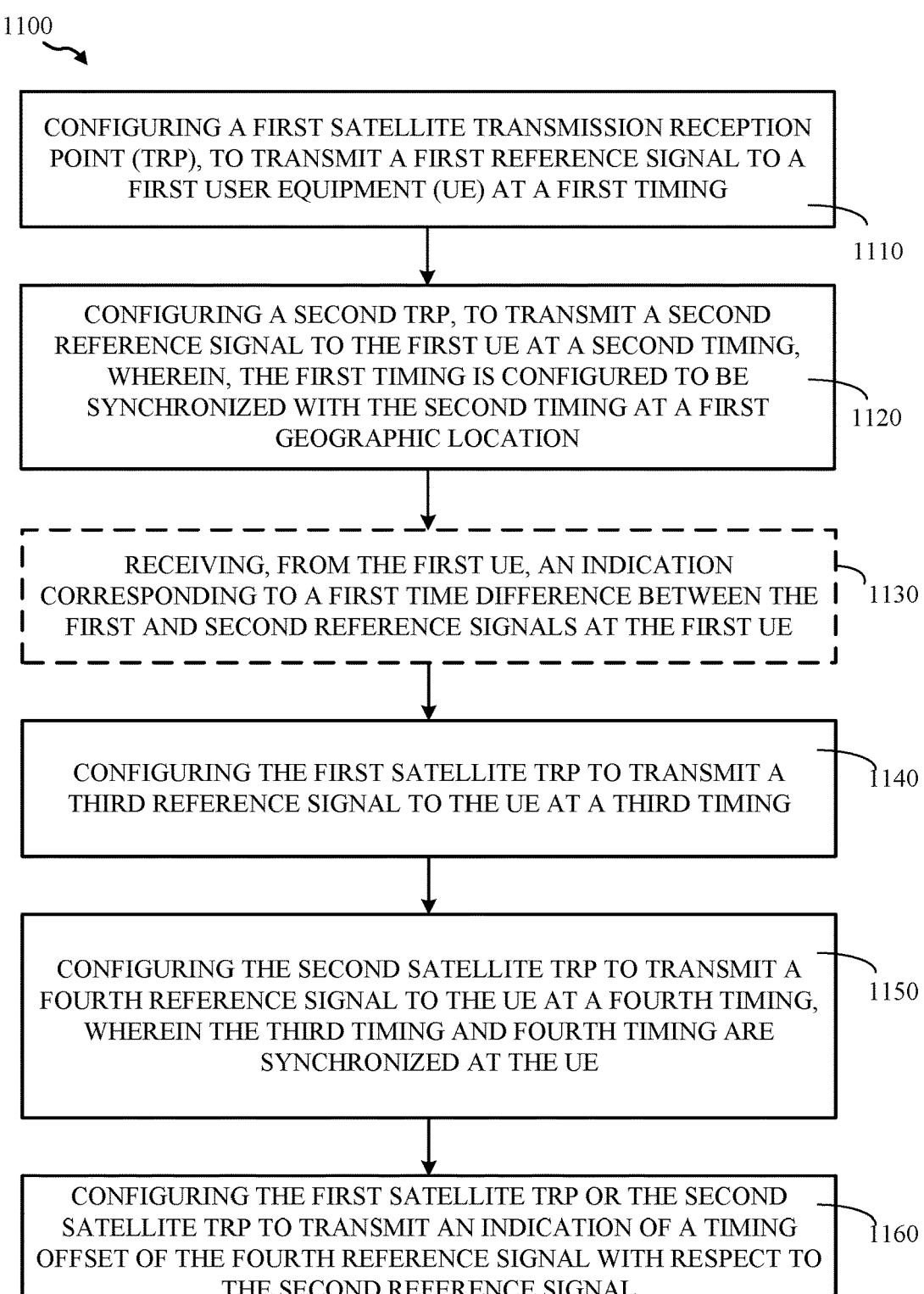

CONFIGURING A FIRST SATELLITE TRANSMISSION RECEPTION POINT (TRP), TO TRANSMIT A FIRST REFERENCE SIGNAL TO A FIRST USER EQUIPMENT (UE) AT A FIRST TIMING

1110

CONFIGURING A SECOND TRP, TO TRANSMIT A SECOND REFERENCE SIGNAL TO THE FIRST UE AT A SECOND TIMING, WHEREIN, THE FIRST TIMING IS CONFIGURED TO BE SYNCHRONIZED WITH THE SECOND TIMING AT A FIRST GEOGRAPHIC LOCATION

1120

RECEIVING, FROM THE FIRST UE, AN INDICATION CORRESPONDING TO A FIRST TIME DIFFERENCE BETWEEN THE FIRST AND SECOND REFERENCE SIGNALS AT THE FIRST UE

1130

CONFIGURING THE FIRST SATELLITE TRP TO TRANSMIT A THIRD REFERENCE SIGNAL TO THE UE AT A THIRD TIMING

1140

CONFIGURING THE SECOND SATELLITE TRP TO TRANSMIT A FOURTH REFERENCE SIGNAL TO THE UE AT A FOURTH TIMING, WHEREIN THE THIRD TIMING AND FOURTH TIMING ARE SYNCHRONIZED AT THE UE

1150

CONFIGURING THE FIRST SATELLITE TRP OR THE SECOND SATELLITE TRP TO TRANSMIT AN INDICATION OF A TIMING OFFSET OF THE FOURTH REFERENCE SIGNAL WITH RESPECT TO THE SECOND REFERENCE SIGNAL

Figure 12:
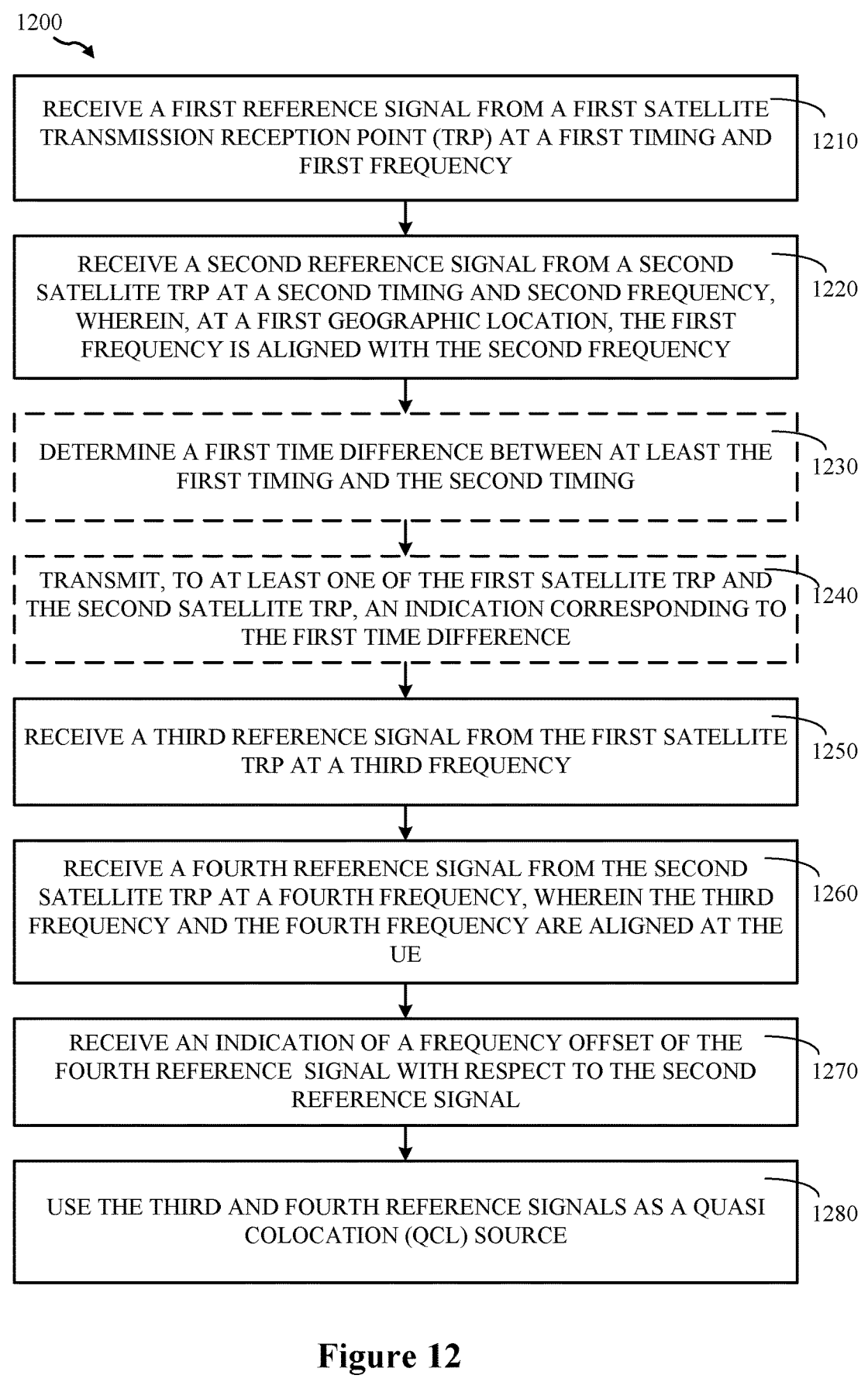

RECEIVE A FIRST REFERENCE SIGNAL FROM A FIRST SATELLITE TRANSMISSION RECEPTION POINT (TRP) AT A FIRST TIMING AND FIRST FREQUENCY — 1210

RECEIVE A SECOND REFERENCE SIGNAL FROM A SECOND SATELLITE TRP AT A SECOND TIMING AND SECOND FREQUENCY, WHEREIN, AT A FIRST GEOGRAPHIC LOCATION, THE FIRST FREQUENCY IS ALIGNED WITH THE SECOND FREQUENCY — 1220

DETERMINE A FIRST TIME DIFFERENCE BETWEEN AT LEAST THE FIRST TIMING AND THE SECOND TIMING — 1230

TRANSMIT, TO AT LEAST ONE OF THE FIRST SATELLITE TRP AND THE SECOND SATELLITE TRP, AN INDICATION CORRESPONDING TO THE FIRST TIME DIFFERENCE — 1240

RECEIVE A THIRD REFERENCE SIGNAL FROM THE FIRST SATELLITE TRP AT A THIRD FREQUENCY — 1250

RECEIVE A FOURTH REFERENCE SIGNAL FROM THE SECOND SATELLITE TRP AT A FOURTH FREQUENCY, WHEREIN THE THIRD FREQUENCY AND THE FOURTH FREQUENCY ARE ALIGNED AT THE UE — 1260

RECEIVE AN INDICATION OF A FREQUENCY OFFSET OF THE FOURTH REFERENCE SIGNAL WITH RESPECT TO THE SECOND REFERENCE SIGNAL — 1270

USE THE THIRD AND FOURTH REFERENCE SIGNALS AS A QUASI COLOCATION (QCL) SOURCE — 1280

Figure 13:
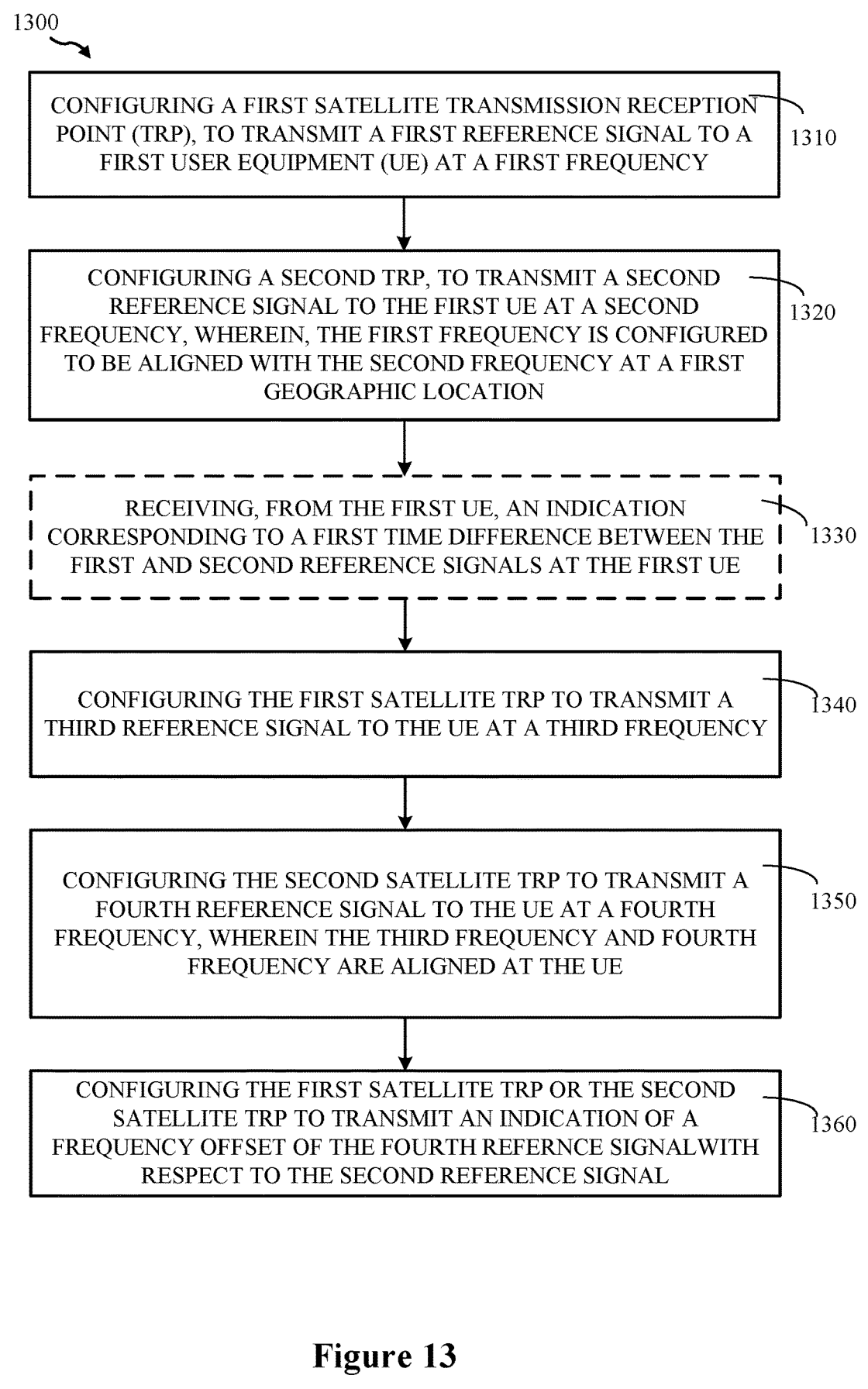

CONFIGURING A FIRST SATELLITE TRANSMISSION RECEPTION POINT (TRP), TO TRANSMIT A FIRST REFERENCE SIGNAL TO A FIRST USER EQUIPMENT (UE) AT A FIRST FREQUENCY          1310

CONFIGURING A SECOND TRP, TO TRANSMIT A SECOND REFERENCE SIGNAL TO THE FIRST UE AT A SECOND FREQUENCY, WHEREIN, THE FIRST FREQUENCY IS CONFIGURED TO BE ALIGNED WITH THE SECOND FREQUENCY AT A FIRST GEOGRAPHIC LOCATION          1320

RECEIVING, FROM THE FIRST UE, AN INDICATION CORRESPONDING TO A FIRST TIME DIFFERENCE BETWEEN THE FIRST AND SECOND REFERENCE SIGNALS AT THE FIRST UE          1330

CONFIGURING THE FIRST SATELLITE TRP TO TRANSMIT A THIRD REFERENCE SIGNAL TO THE UE AT A THIRD FREQUENCY          1340

CONFIGURING THE SECOND SATELLITE TRP TO TRANSMIT A FOURTH REFERENCE SIGNAL TO THE UE AT A FOURTH FREQUENCY, WHEREIN THE THIRD FREQUENCY AND FOURTH FREQUENCY ARE ALIGNED AT THE UE          1350

CONFIGURING THE FIRST SATELLITE TRP OR THE SECOND SATELLITE TRP TO TRANSMIT AN INDICATION OF A FREQUENCY OFFSET OF THE FOURTH REFERNCE SIGNALWITH RESPECT TO THE SECOND REFERENCE SIGNAL          1360

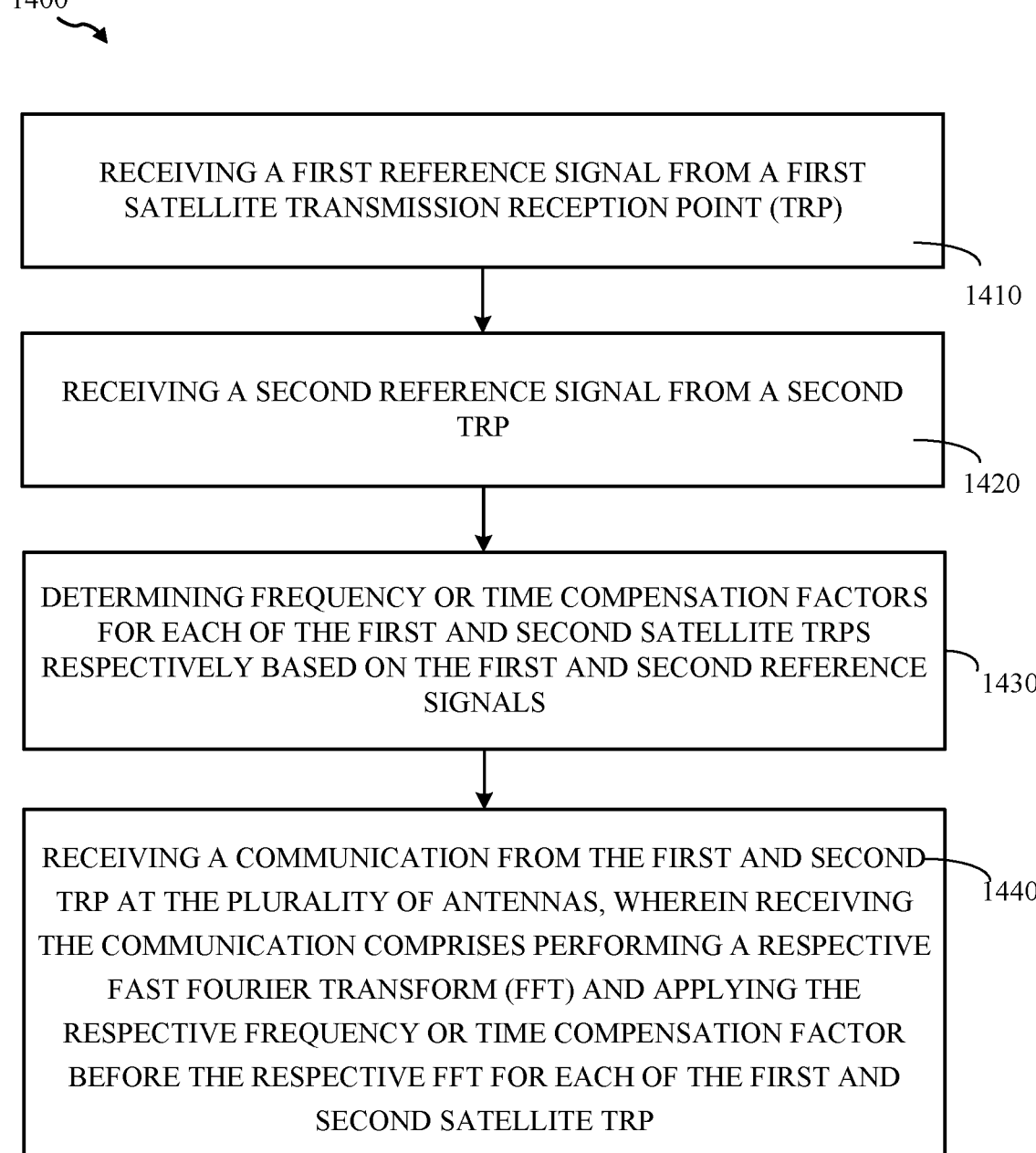

RECEIVING A FIRST REFERENCE SIGNAL FROM A FIRST SATELLITE TRANSMISSION RECEPTION POINT (TRP)

1410

RECEIVING A SECOND REFERENCE SIGNAL FROM A SECOND TRP

1420

DETERMINING FREQUENCY OR TIME COMPENSATION FACTORS FOR EACH OF THE FIRST AND SECOND SATELLITE TRPS RESPECTIVELY BASED ON THE FIRST AND SECOND REFERENCE SIGNALS

1430

RECEIVING A COMMUNICATION FROM THE FIRST AND SECOND TRP AT THE PLURALITY OF ANTENNAS, WHEREIN RECEIVING THE COMMUNICATION COMPRISES PERFORMING A RESPECTIVE FAST FOURIER TRANSFORM (FFT) AND APPLYING THE RESPECTIVE FREQUENCY OR TIME COMPENSATION FACTOR BEFORE THE RESPECTIVE FFT FOR EACH OF THE FIRST AND SECOND SATELLITE TRP

Figure 15:
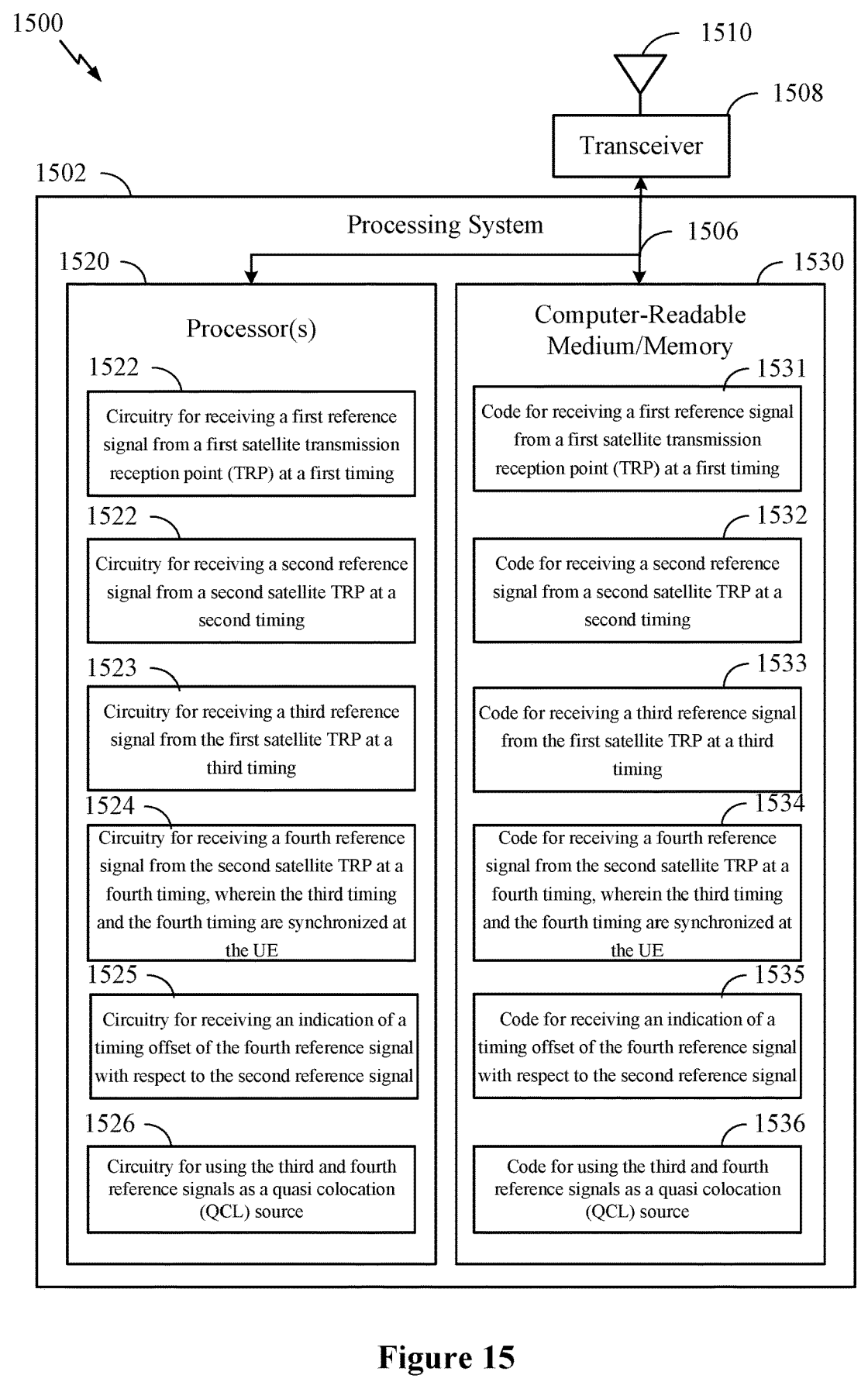

Transceiver

1502

Processing System

1506

1520

Processor(s)

1530

Computer-Readable
Medium/Memory

1531

1522

Circuitry for receiving a first reference
signal from a first satellite transmission
reception point (TRP) at a first timing Code for receiving a first reference signal
from a first satellite transmission
reception point (TRP) at a first timing

1522

1532

Circuitry for receiving a second reference
signal from a second satellite TRP at a
second timing Code for receiving a second reference
signal from a second satellite TRP at a
second timing

1523

1533

Circuitry for receiving a third reference
signal from the first satellite TRP at a
third timing Code for receiving a third reference signal
from the first satellite TRP at a third
timing

1524

1534

Circuitry for receiving a fourth reference
signal from the second satellite TRP at a
fourth timing, wherein the third timing
and the fourth timing are synchronized at
the UE Code for receiving a fourth reference
signal from the second satellite TRP at a
fourth timing, wherein the third timing
and the fourth timing are synchronized at
the UE

1525

1535

Circuitry for receiving an indication of a
timing offset of the fourth reference signal
with respect to the second reference signal Code for receiving an indication of a
timing offset of the fourth reference signal
with respect to the second reference signal

1526

1536

Circuitry for using the third and fourth
reference signals as a quasi colocation
(QCL) source Code for using the third and fourth
reference signals as a quasi colocation
(QCL) source

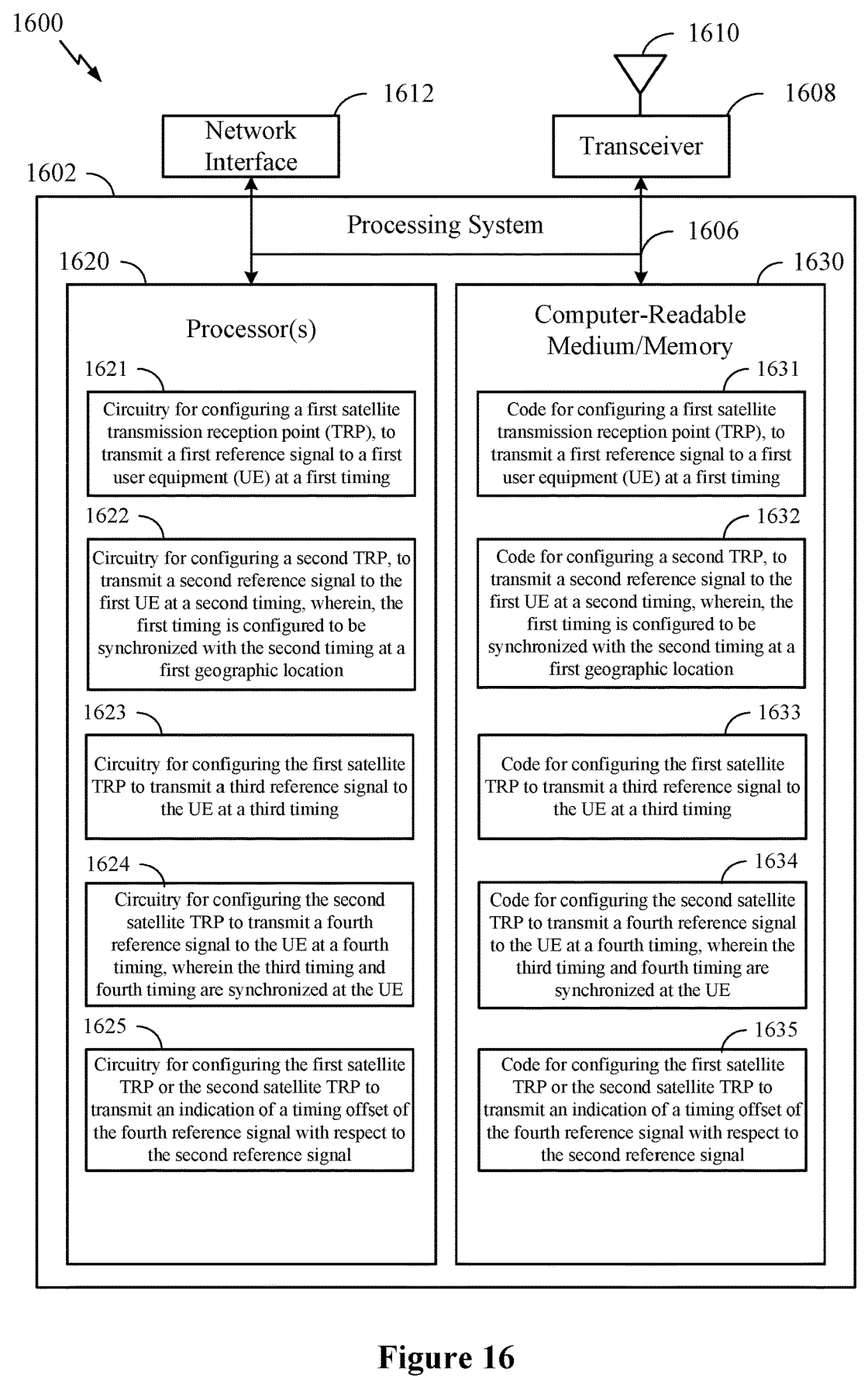

Network Interface

Transceiver

1602

Processing System

1606

1620

1630

Processor(s)

Computer-Readable Medium/Memory

1621

Circuitry for configuring a first satellite transmission reception point (TRP), to transmit a first reference signal to a first user equipment (UE) at a first timing

1631

Code for configuring a first satellite transmission reception point (TRP), to transmit a first reference signal to a first user equipment (UE) at a first timing

1622

Circuitry for configuring a second TRP, to transmit a second reference signal to the first UE at a second timing, wherein, the first timing is configured to be synchronized with the second timing at a first geographic location

1632

Code for configuring a second TRP, to transmit a second reference signal to the first UE at a second timing, wherein, the first timing is configured to be synchronized with the second timing at a first geographic location

1623

Circuitry for configuring the first satellite TRP to transmit a third reference signal to the UE at a third timing

1633

Code for configuring the first satellite TRP to transmit a third reference signal to the UE at a third timing

1624

Circuitry for configuring the second satellite TRP to transmit a fourth reference signal to the UE at a fourth timing, wherein the third timing and fourth timing are synchronized at the UE

1634

Code for configuring the second satellite TRP to transmit a fourth reference signal to the UE at a fourth timing, wherein the third timing and fourth timing are synchronized at the UE

1625

Circuitry for configuring the first satellite TRP or the second satellite TRP to transmit an indication of a timing offset of the fourth reference signal with respect to the second reference signal

1635

Code for configuring the first satellite TRP or the second satellite TRP to transmit an indication of a timing offset of the fourth reference signal with respect to the second reference signal

Figure 16

MULTIPOINT TRANSMISSION FOR NON-TERRESTRIAL NETWORKS

TECHNICAL FIELD

This disclosure relates generally to wireless communication and, more specifically, to multipoint transmission for non-terrestrial networks.

DESCRIPTION OF THE RELATED TECHNOLOGY

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Some wireless communications systems, such as non-terrestrial networks (NTNs), may utilize satellites (e.g., airborne or spaceborne platforms) as relay devices between ground base stations and ground gateways. In NTNs, the satellite may be moving at a high-speed relative to UEs operating within the NTN, which may be at or relatively near ground level. In some implementations, a satellite is configured to emit one or more beams for a coverage area provided by the satellite to a UE. The satellite's orientation or beam transmission characteristics may be adjusted to change the coverage provided to the UE. Solutions to improve coverage, reliability or throughput for NTN communications may be desired.

SUMMARY

In some aspects, a method for wireless communication at a user equipment (UE) is provided. The method includes: receiving a first reference signal from a first satellite transmission reception point (TRP) at a first timing, receiving a second reference signal from a second satellite TRP at a second timing, receiving a third reference signal from the first satellite TRP at a third timing, receiving a fourth reference signal from the second satellite TRP at a fourth timing, wherein the third timing and the fourth timing are synchronized at the UE, receiving an indication of a timing offset of the fourth reference signal with respect to the second reference signal, and using the third and fourth reference signals as a quasi colocation (QCL) source.

In some aspects, a method for wireless communication by a network entity is provided. The method includes: configuring a first satellite transmission reception point (TRP), to transmit a first reference signal to a first user equipment (UE) at a first timing; configuring a second TRP, to transmit a second reference signal to the first UE at a second timing, configuring the first satellite TRP to transmit a third reference signal to the UE at a third timing, configuring the second satellite TRP to transmit a fourth reference signal to the UE at a fourth timing, wherein the third timing and fourth timing are synchronized at the UE, and configuring the first satellite TRP or the second satellite TRP to transmit an indication of a timing offset of the fourth reference signal with respect to the second reference signal.

In some aspects, a method of wireless communication by a user equipment (UE) having a plurality of antennas is provided. The method comprises receiving a first reference signal from a first satellite transmission reception point (TRP); receiving a second reference signal from a second TRP; determining frequency or time compensation factors for each of the first and second satellite TRPs respectively based on the first and second reference signals; and receiving a communication from the first and second TRP at the plurality of antennas, wherein receiving the communication comprises performing a respective fast Fourier transform (FFT) and applying the respective frequency or time compensation factor before the respective FFT for each of the first and second satellite TRP.

Other aspects provide: an one or more apparatuses operable, configured, or otherwise adapted to perform any portion of any method described herein one or more of the aforementioned methods and/or those described elsewhere herein, (e.g., such that performance may be by only one apparatus or in a distributed fashion across multiple apparatuses); a one or more non-transitory, computer-readable media comprising instructions that, when executed by one or more a processors of an one or more apparatuses, cause the one or more apparatuses to perform any portion of any method described herein the aforementioned methods as well as those described elsewhere herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more a computer program products embodied on one or more a computer-readable storage medium media comprising code for performing any portion of any method described herein the aforementioned methods as well as those described elsewhere herein (e.g., such that code may be stored in only one computer-readable medium or across computer-readable media in a distributed fashion); and/or one or more apparatuses comprising one or more means for performing any portion of any method described herein the aforementioned methods as well as those described elsewhere herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

FIG. 10 shows a flowchart illustrating an example for enabling multi-TRP transmission in a NTN by a UE.

FIG. 11 shows a flowchart illustrating an example process for enabling multi-TRP transmission in a NTN by a network entity.

FIG. 12 shows a flowchart illustrating an example process for enabling multi-TRP transmission in a NTN by a UE.

FIG. 13 shows a flowchart illustrating an example process for enabling multi-TRP transmission in a NTN by a network entity.

FIG. 14 shows a flowchart illustrating an example process for enabling multi-TRP transmission in a NTN by a UE.

FIG. 15 shows aspects of an example UE.

FIG. 16 shows aspects of an example network entity.

Like reference numbers and designations in the various drawings indicate like elements.

DETAILED DESCRIPTION

Figure 1:
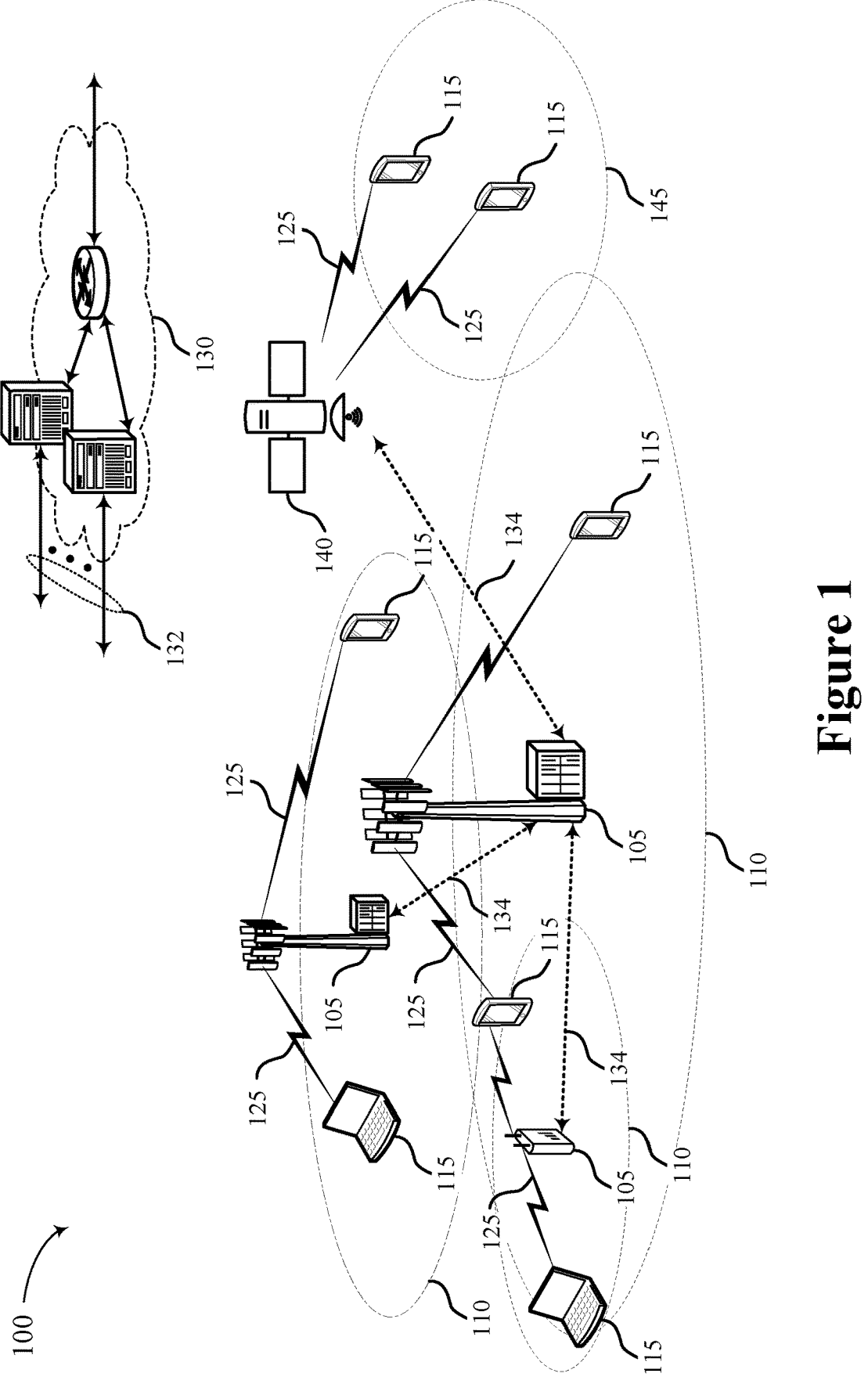
FIG. 1 shows a diagram of an example wireless communications system and an access network.

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Various implementations relate generally to enabling multi-transmission point (TRP) transmissions in a non-terrestrial network (NTN) wireless communications system (also referred to as an NTN cellular communication system) to a user equipment (UE) serviced by a satellite. A satellite may transmit one or more satellite beams to service one or more UEs in a coverage area (such as provide downlink (DL) traffic to the UE and receive uplink (UL) traffic from the UE). Each beam may have similar or its own bandwidth part (BWP) and other beam-specific parameters (such as physical random-access channel (PRACH) parameters, timers, delay-specific configurations, and so on) for the UE to communicate with the network (such as communicating with the satellite, and the satellite communicating with a base station).

A satellite of the NTN includes an ephemeris, and a coverage area of the satellite for a cellular network is dependent on the ephemeris. A UE configured for the NTN may be aware of the satellite ephemeris of the satellites of the NTN (e.g., the UE may otherwise be aware of the coverage area of a satellite of the NTN). In this manner, a UE may determine that the UE is to be serviced by a specific satellite for a certain geographic area at a certain time. As a result, the UE may sense one or more beams from the satellite for DL communications or may attempt to access a random access channel (RACH) for the satellite for UL communications.

In addition to a satellite's ephemeris, a satellite's coverage area is dependent on a satellite behavior. A satellite behavior refers to one or more characteristics effecting the satellite's coverage for UEs serviced by the network, and may include a transmit power for one or more beams, a focus of one or more beams, and a satellite attitude (including a roll, pitch, and yaw of the satellite).

While single satellite connectivity may provide effective communication for UEs, improvements to coverage, reliability or throughput are always desirable. One way to make such improvements is to enable simultaneous connectivity for a UE to multiple non-terrestrial network (NTN) or satellite transmission points (TRPs). As will be explained in greater detail below though, implementing multi-TRP communication in an NTN presents practical difficulties. This is because the large differences in position and velocity between satellites or NTN nodes involved in multi-TRP communication can lead to large timing and frequency differences in the signals received by a UE. Such timing and frequency differences may be able to be compensated for for a single UE, but for multiple UEs at different locations in the coverage of two or more satellite TRPs, not all UEs will be able to experience synchronized signals aligned in frequency from multiple satellite TRPs using such compensation. The present application provides methods and apparatuses to overcome these challenges and allow simultaneous multi-TRP communication for multiple UEs at different locations under the coverage of two or more NTN TRPs. More specifically, the present disclosure provides techniques for UEs at different locations under the coverage of multiple satellite TRPs to communicate using multi-TRP by providing different timing and/or frequency sources for UEs in different areas within a beam footprint such that UEs receive signals from the TRPs involved in the multi-TRP communication within certain thresholds of time synchronization and/or frequency alignment.

Other techniques are also provided for a UE to process signals from multiple satellite TRPs independently such that processing by the NTN is simplified.

FIG. 1 shows a diagram of an example wireless communications system 100 and an access network. The wireless communications system 100 includes base stations 105, UEs 115, one or more satellites 140, and a core network 130. In some examples, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations, a base station included in a satellite 140 of an NTN, and so on). The UEs 115 described herein may be able to communicate with various types of base stations 105 and network equipment including macro eNBs, small cell eNBs, gNBs, relay base stations, and the like.

Each base station 105 may be associated with a particular satellite coverage area 110 in which communications with various UEs 115 are supported. Each base station 105 may provide communication coverage for a respective satellite coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Wireless communications system 100 may be a non-terrestrial network (NTN) and may utilize one or more satellites 140 (which may broadly refer to any high-altitude platform) (e.g., as relay devices). For example, base stations 105 (or ground gateways) may wirelessly communicate with UEs 115 via one or more satellites 140 (e.g., or high-altitude platforms). The satellites 140 may relay communications between base stations 105 and UEs 115, or in some implementations comprise or otherwise perform functions ascribed herein to base stations 105. Each satellite 140 may be associated with a geographic area 145 in which communications with various UEs 115 is supported. In some implementations, a geographic area 145 may have properties ascribed herein to geographic coverage areas 110. Each satellite 140 may provide communication coverage for a respective geographic area 145 via communication links 125, and communication links 125 between a satellite 120 and a UE 115 may utilize one or more carriers.

Communication links 125 shown in wireless communications system 100 may include upstream transmissions from a UE 115 (e.g., to a satellite 140, to a base station 105 via satellite 140), or downstream transmissions to a UE 115 (e.g., from a satellite 140, from a base station 105 via satellite 140). In some implementations, transmissions from the ground (e.g., from a UE 115 or base station 105) to a satellite 140 may be referred to as uplink transmissions and transmissions from a satellite 140 to the ground (e.g., to a UE 115 or base station 105) may be referred to as downlink transmissions. Thus, depending on whether a gateway (e.g., a base station 105) may be collocated with (e.g., included in) a satellite 140 or at the ground, either upstream or downstream transmissions may include a mix of uplink and downlink transmissions.

Downstream transmissions may also be called forward link transmissions while upstream transmissions may also be called reverse link transmissions. A geographic area 145 may be an area associated with a transmission beam of a satellite 140. In some implementations, a geographic area 145 may be referred to as a beam footprint.

The geographic coverage area 110 for a base station 105 or the geographic area 145 for a satellite 140 may be divided into sectors making up only a portion of the geographic coverage area 110 or the geographic area 145, and in some implementations, each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 or satellite 140 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 or geographic area 145 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some implementations, UEs 115 may be designed to support critical functions (e.g., mission critical functions), and a wireless communications system 100 may be configured to provide ultra-reliable communications for these functions.

In some implementations, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130). Base stations 105 may communicate with satellites 140 wirelessly over backhaul links 134 (e.g., via an X2 or another interface).

The core network 130 may provide user authentication, access authorization, tracking. Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHZ.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHZ ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105, satellite 140, or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105, a satellite 140) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a satellite 140, a base station 105, or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a satellite 140 or a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some implementations, the antennas of a base station 105, a satellite 140, or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 or satellite 140 may be located in diverse geographic locations. A base station 105 or a satellite 140 may have an antenna array with a number of rows and columns of antenna ports that the base station 105 or the satellite 140 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some implementations perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some implementations, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some aspects, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini slots are aggregated together and used for communication between a UE 115 and a base station 105 or between a UE 115 and a satellite 140.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHZ). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some implementations, a carrier may be subdivided into portions, each portion having a smaller bandwidth than the carrier bandwidth (e.g., 100 MHZ), and such portions may be referred to as bandwidth parts or BWPs. For example, some devices (e.g., some UEs 115) may not support the full bandwidth of a carrier, and thus may communicate using one or more BWPs. In some implementations, a UE 115 may establish communications with a base station 105 or satellite 140 using a first BWP, which may be referred to as an initial BWP, and the UE 115 may thereafter switch to a different BWP. In some implementations, BWPs may be paired or otherwise grouped. For example, a UE 115 may communicate using paired or grouped uplink and downlink BWPs (e.g., in an FDD implementation). Further, in some implementations a UE 115 that switches to a different BWP may switch (e.g., concurrently or simultaneously or as part of a single BWP-switching operation) from a first pair or other group of BWPs to a second pair or other group BWPs.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some implementations, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115, base station 105, or satellite 140 utilizing eCCs may transmit wideband signals (e.g., according to frequency channel or carrier bandwidths of 20, 40, 60, 80 MHZ, etc.) at reduced symbol durations (e.g., 16.67 microseconds). A TTI in eCC may consist of one or multiple symbol periods. In some implementations, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figures 2A, 2B, 2C, 2D:
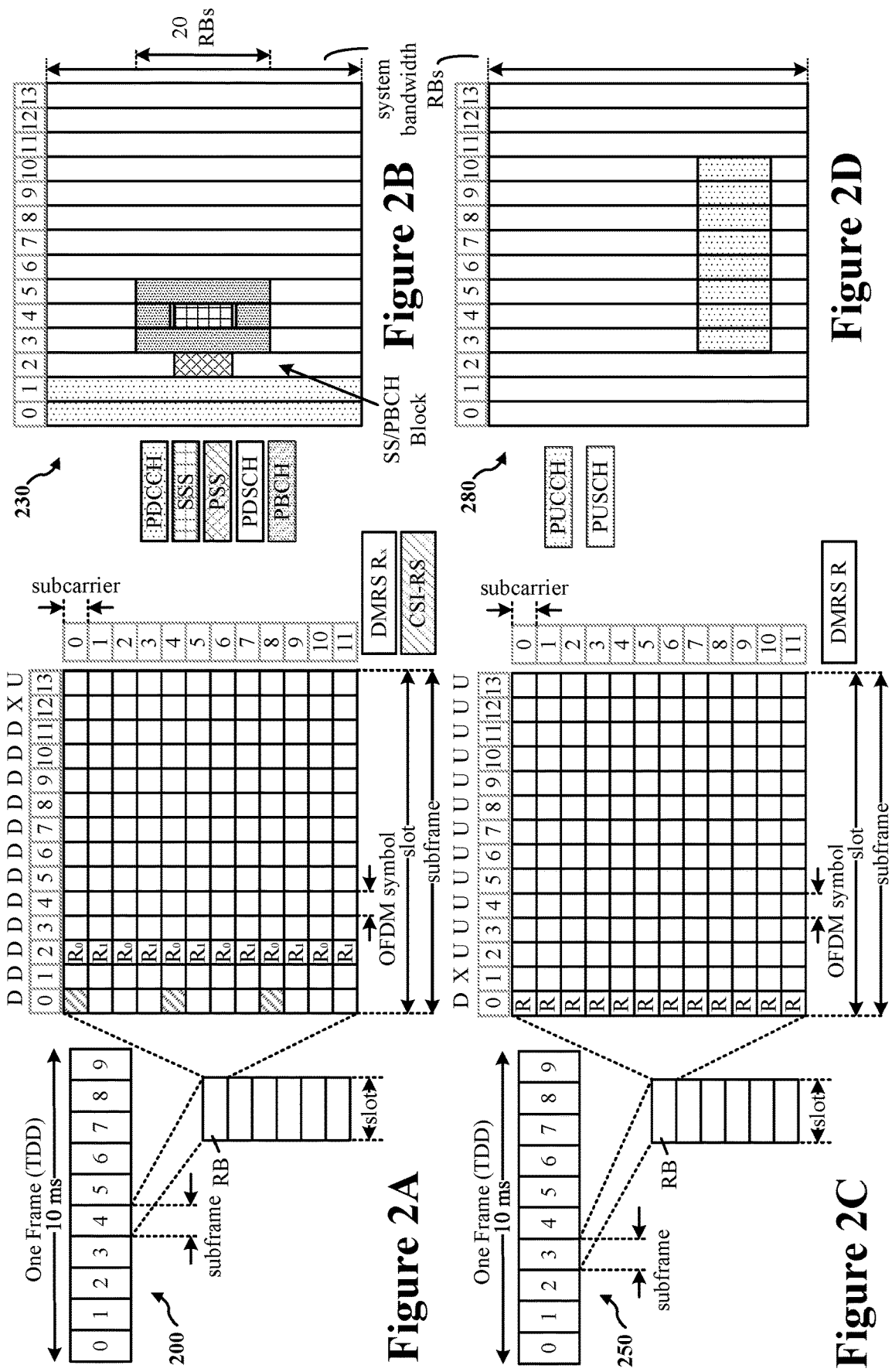
FIG. 2A shows an example of a first slot within a 5G/NR frame structure.
FIG. 2B shows an example of downlink (DL) channels within a 5G/NR slot.
FIG. 2C shows an example of a second slot within a 5G/NR frame structure.
FIG. 2D shows an example of uplink (UL) channels within a 5G/NR slot.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structures and/or different channels. A frame (10 ms) may be divided into 10 equally sized subframes (1 ms). Each subframe may include one or more time slots. Subframes may also include mini slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 microseconds ($\mu$s).

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 115 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
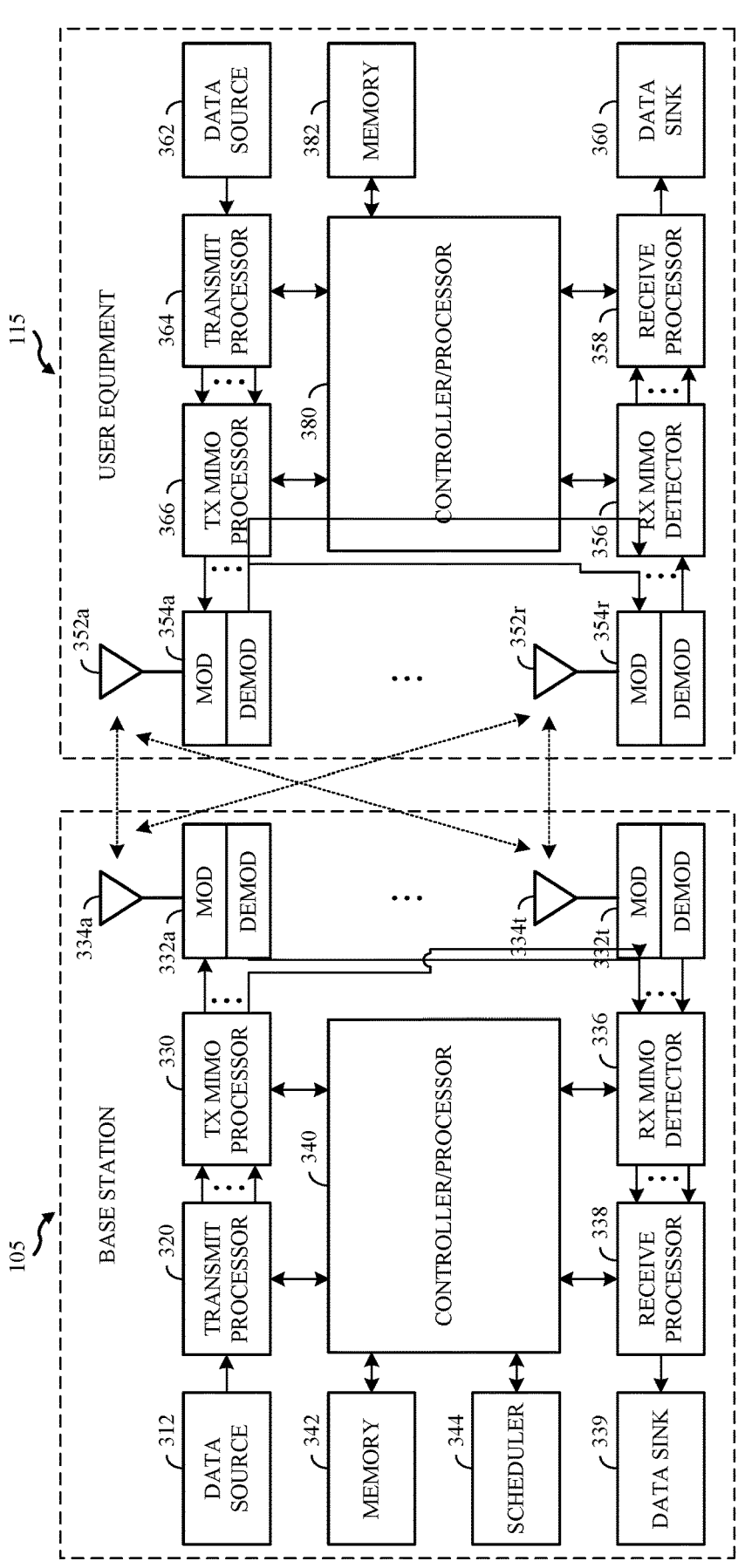
FIG. 3 shows aspects of an example base station and an example user equipment (UE).

FIG. 3 depicts aspects of an example BS 105 and a UE 115.

Generally, BS 105 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 105 may send and receive data between BS 105 and UE 104. BS 105 includes controller/processor 340, which may be configured to implement various functions described herein related to wireless communications.

Generally, UE 115 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 115 includes controller/processor 380, which may be configured to implement various functions described herein related to wireless communications.

In regards to an example downlink transmission, BS 105 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 115 includes antennas 352*a-352r* that may receive the downlink signals from the BS 105 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 115 to a data sink 360, and provide decoded control information to a controller/processor 380.

In regards to an example uplink transmission, UE 115 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 105, the uplink signals from UE 115 may be received by antennas 334*a-t*, processed by the demodulators in transceivers 332*a-332t*, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 105 and UE 104, respectively.

Scheduler 344 may schedule UEs for data transmission on the downlink and/or uplink.

In various aspects, BS 105 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 115 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

Figure 4:
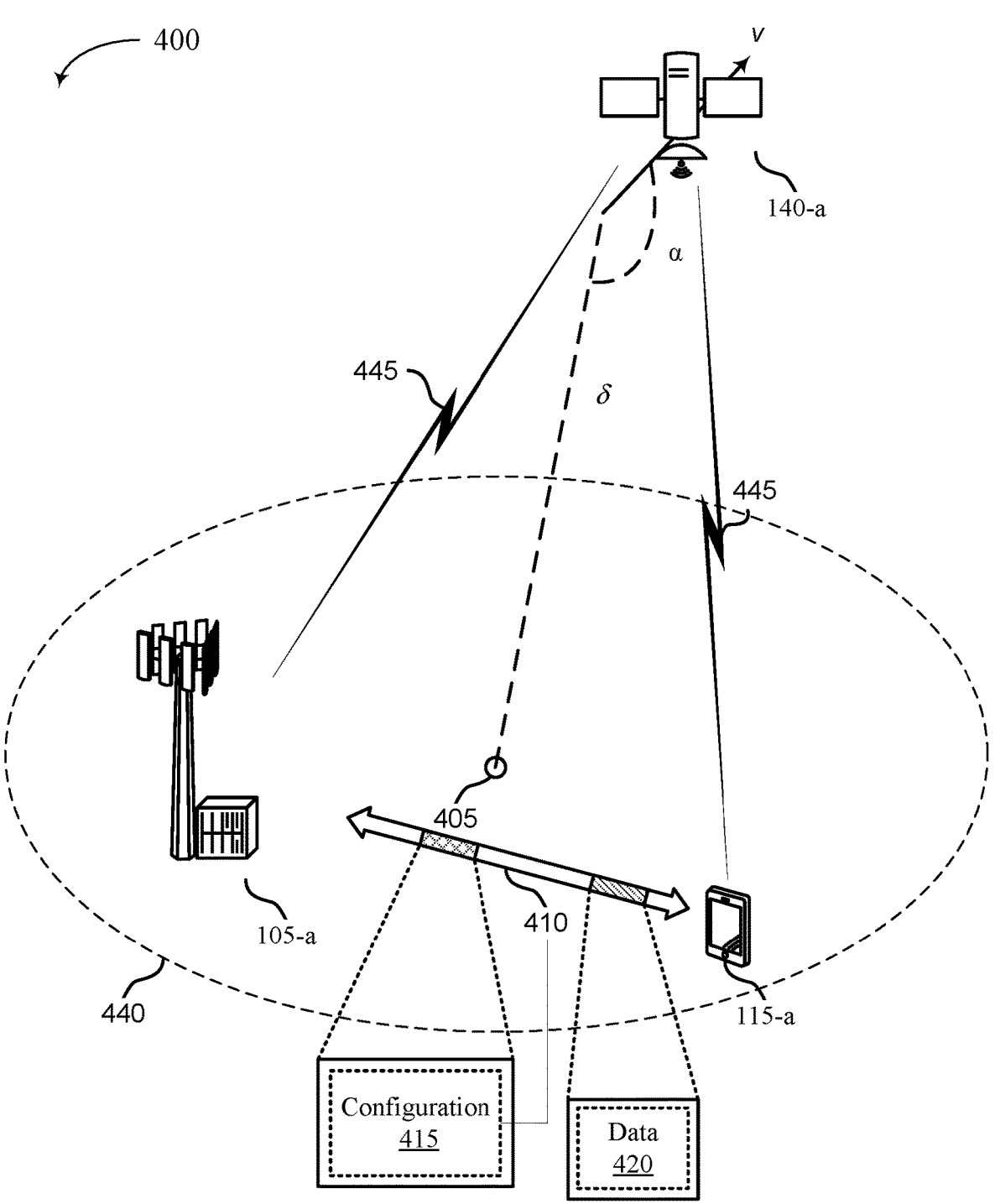
FIG. 4 shows an example portion of a non-terrestrial network (NTN) wireless communications system including a gateway, a satellite and a user equipment (UE).

FIG. 4 illustrates an example of a wireless communications system 300 that supports random access procedures for non-terrestrial networks in accordance with one or more aspects of the present disclosure. In some examples, the wireless communications system 400 may implement aspects of the wireless communications system 100. The wireless communications system 400 may include a base station 105-a, a UE 115-a, and a satellite 140-a, which may be examples of the corresponding devices described with reference to FIG. 1. For example, the wireless communications system 400 may be a non-terrestrial network, which may include a base station 105-a, a UE 115-a, and a satellite 140-a. The satellite 140-a may relay communications for base stations (e.g., base station 105-a) and mobile terminals (e.g., UE 115-a). The base station 105-a may also be referred to as a gateway. The geographical area associated with a transmission beam of the satellite 140-a may be called a beam footprint 430 and UE 115-a may communicate with the satellite 140-a when the UE 115-a is located within the beam footprint 430.

The base station 105-a may perform a communication procedure (e.g., an RRC procedure, such as a cell acquisition procedure, random access procedure, RRC connection procedure, RRC configuration procedure) with the UE 115-a. That is, the base station 105-a may perform The base station 105-a may be configured with multiple antennas, which may be used for directional or beamformed transmissions. As part of the communication procedure, the base station 105-a may establish a bi-directional communication link 310 for communication with the UE 115-a. Additionally, or alternatively, as part of the communication procedure, the base station 105-a may configure the UE 115-a with configuration 415 (e.g., time and frequency resources, a reference signal periodicity, an indication of a symbol of a slot for transmitting reference signals) via RRC signaling. Although shown communicating directly, the present disclosure primarily focuses on when the UE 115-a communicates to the base station 105-a via the satellite 140-a.

The satellite 140-a may generate satellite information (e.g., ephemeris information) associated with communications between the satellite 140-a, the UE 115-a, and the base station 105-a. For example, the satellite 140-a may determine a propagation delay associated with transmissions between the satellite 140-a, the UE 115-a, and the base station 105-a. In some cases, the propagation delay may be based on the distance $\delta$ from the satellite 140-a to the point 405 (e.g., center) of the beam footprint 430. In other cases, the propagation delay may be a factor of the distance $\delta$, which may correspond to the round-trip distance between the base station 105-a and the satellite 140-a. Additionally or alternatively, the propagation delay may be an estimated round trip delay or a round-trip time between the UE 115-a and the base station 105-a, which may be based at least in part on $\delta$ and/or $2\delta$. It should be noted that the distance $\delta$ may not reflect the precise distance from the satellite 140-a to the UE 115-a. For example, the UE 115-a may be located at an edge of the beam footprint 330 and may be a different distance from the satellite 140-a than $\delta$. However, such a difference in distance may be insignificant compared to $\delta$. Thus, the distance $\delta$ may be a sufficient representation of the distance from the satellite 140-a to the UE 115-a.

The satellite 140-a may transmit, via wireless communication links 335, the satellite information to the base station 105-a and/or the UE 115-a, which may be located within the beam footprint 330. In some cases, the satellite 140-a may update and transmit the satellite information to the base station 105-a and/or the UE 115-a at a preconfigured schedule (e.g., an update rate). The preconfigured schedule may be based on a velocity of the satellite 140-a. For example, the velocity of the satellite 140-a may result in a maximum round-trip time variation rate of 50 µs per second. That is, for every second of movement of the satellite 140-a, the round-trip time of communications between the satellite 140-a and the UE 115-a, for example, may vary by 50 µs. The round-trip time variation rate may also vary based on the movement of the satellite (e.g., orbit). In such instances, the satellite 140-a may update the satellite information multiple times every second. Additionally, or alternatively, the base station 105-a may transmit the satellite information to the UE 115-a via the bi-directional communication link 410, for example, as part of the configuration 415. In some cases, the base station 105-a may transmit the satellite information to the UE 115-a based on the preconfigured schedule, for example, the update rate of the satellite 140-a.

The satellite information may also include the velocity of the satellite 140-a. The velocity of the satellite 140-a may, in some cases, be defined by or relate to the following expression $v \times \cos(\alpha)$, where a is the angle between the vector of velocity v and the vector of distance $\delta$. The UE 115-a may use the velocity of the satellite 140-a to determine the round-trip time variation rate. In some cases, the UE 115-a may determine the round-trip time variation rate using the velocity of the satellite 140-a based at least in part on the UE 115-a being located relative to the point 405 of the beam footprint 430. In some examples, using the velocity of the satellite 140-a, the round-trip time variation rate may be defined by the following expression $-2v \times \cos(\alpha)/c$, where a is the angle between the vector of velocity v and the vector of distance δ, and c is the speed of light. As such, if an upstream transmission is scheduled to be transmitted at time $t_0$ with a timing adjustment $t_a$, the actual transmission time by the UE 115-a may be $t_0+t_a$. For a subsequent upstream transmission scheduled to be transmitted at time $t_a+\Delta t$ without a new timing adjustment provided by the base station 105-a, the actual transmission time by the UE 115-a may be $t_a+\Delta t \times(-\lambda v \times \cos(\alpha)/c)$.

Although FIG. 4 shows a wireless communication system in which the functionality of a base station is ground-based, it will be appreciated that in some cases, the base station (e.g., a gNB) may be itself on the satellite, or the functionality of the base station may be split between the satellite and the gateway (e.g., the satellite may be a distributed unit (DU) and the gateway a central unit (CU), or other architectures). In some such aspects, the gateway may provide access to a core network for a base station on the satellite. More generally, there may be different splits in protocol layers between the gateway and the satellite. For example, satellite 140-a may perform one or more of physical layer functionality, media access control (MAC) layer and lower functionality, radio link control (RLC) layer and lower functionality, packet data convergence protocol (PDCP) layer and lower functionality, or radio resource control (RRC) layer and lower functionality. One or more aspects of the techniques described herein may be applicable in scenarios where the gNB is on the gateway, the satellite, or the functionality of different protocol layers is split among gateway and satellite.

Aspects of the techniques described herein relate to enabling simultaneous connectivity to multiple non-terrestrial network (NTN) or satellite transmission points (TRPs). Compared to single satellite connectivity, connectivity through multiple satellite TRPs may increase coverage, reliability or throughput (e.g. by increasing the degrees of freedom using 2×2 or higher order MIMO).

In conventional systems for multi-TRP communication, the split between TRPs is typically at the physical layer. That is, the TRPs involved in a multi-TRP transmission share MAC and higher layers, but have separate physical layers. For effective communication, such systems involve tight interaction between the different TRPs. The time difference between signals arriving at a UE from the TRPs should be negligible (e.g. for a CP-OFDM system, the signals should arrive within a CP duration of one another) and, if timing advance groups (TAGs) are configured, the TRPs should belong to the same TAG.

Such tight interaction presents challenges for implementing multi-TRP for NTN communication because the differences in position and velocity between satellites or NTN nodes can be large, meaning that there can be large timing and frequency differences between signals from the satellites or NTN nodes, as received by a UE. For a single UE at a static location, timing and frequency may be compensated so that the UE experiences the synchronized signals aligned in frequency from multiple satellite TRPs, but for multiple UEs at different locations under the coverage of two or more satellite TRPs, not all UEs could experience synchronized signals aligned in frequency from multiple satellite TRPs using such compensation. Even within directional beams from different satellite TRPs, given the large orbital height of satellite TRPs, there may be significant timing differences within the coverage area of the satellite TRPs.

For example, in an NR communication system, the CP may be 6 μs (depending on the numerology). The distance over which signals from two distinct TRPs can maintain synchronization to within the CP duration therefore corresponds to approximately 1.8 km (i.e. the product of the CP duration and the speed of light).

Figure 5:
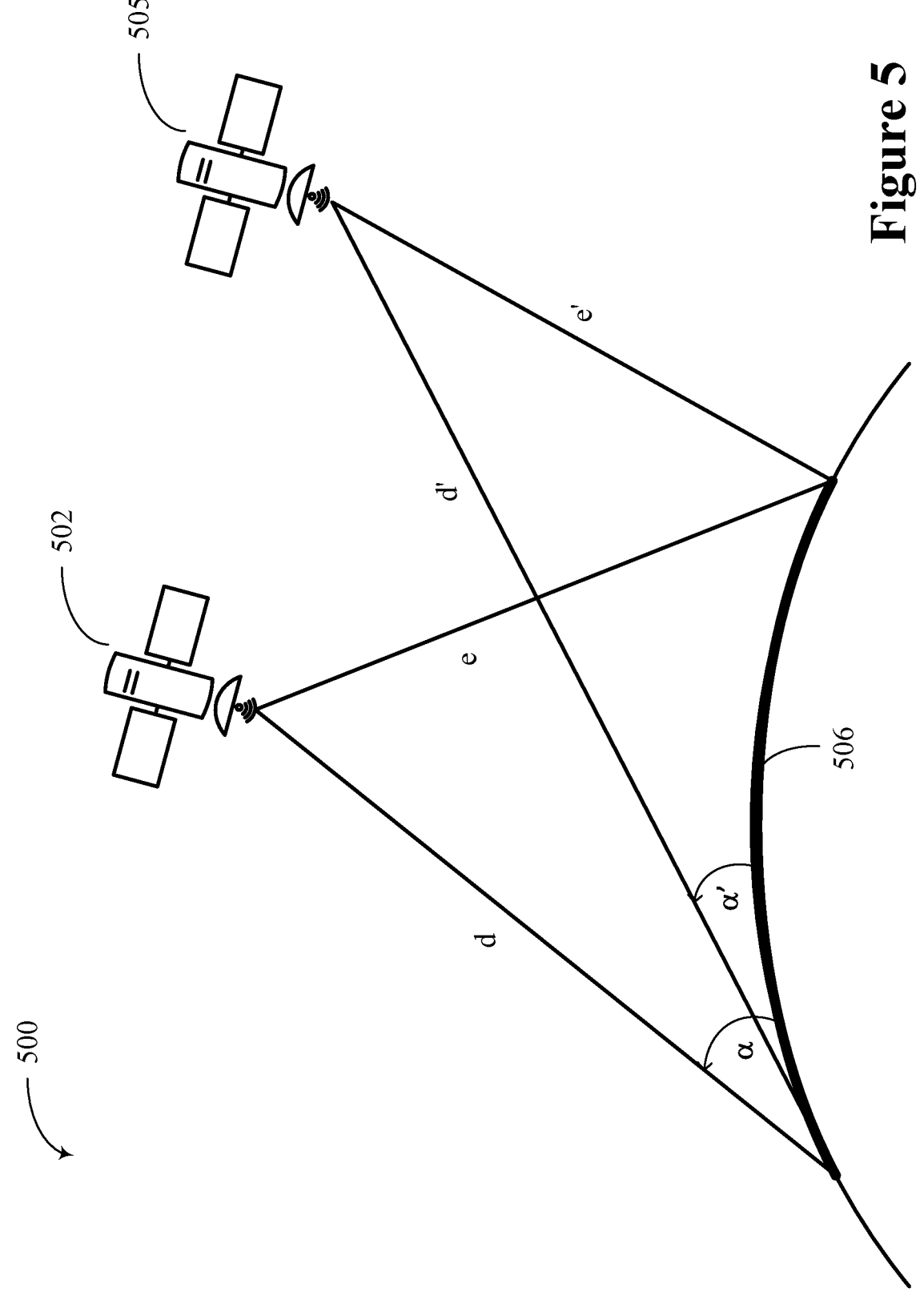
FIG. 5 shows an example portion of an NTN wireless communications system including two satellites.

FIG. 5 illustrates geometrically how timing differences may manifest in multi-TRP satellite transmission. Satellite TRP 502 and satellite TRP 504 may be configured for multi-TRP transmission. Antenna arrays of each TRP are configured to generate respective beams that are substantially aligned at the Earth's surface to form beam footprint 506. Elevation angles α and α' may be defined at one extreme of the beam footprint 506 between the surface of the Earth and satellite TRP 502 and satellite TRP 504 respectively. The time delays in transmitting a signal from satellite TRP 502 and satellite TRP 504 to that extreme are denoted d and d' respectively. Similarly, time delays in transmitting a signal from satellite TRP 502 and satellite TRP 504 to an opposite extreme are denoted e and e' respectively.

A signal leaving 402 at t=0 will arrive at extreme 508 at t=d. If a same signal from 504 is configured to be transmitted in advance by the difference in the delay paths d'-d, the signals received at 508 will be synchronized. However, the same signals received at extreme 510 will be out of synchronization by an amount (e-e')−(d-d'), i.e. a difference between delay differences.

An approximate numerical example is provided in Table 1 below, showing the difference between delay differences in both kilometers and microseconds for different combinations of elevation angles for satellite TRPs 502 and 504. The numerical example is based on a 10 km beam size between extremes 508 and 510 and an orbiting height of 600 km for satellite TRPs 502 and 504.

TABLE 1

| | Elevation Angle (°) | | | | | | | |
|---|---|---|---|---|---|---|---|---|
| | 70 | | 50 | | 30 | | 10 | |
| | km | μs | km | μs | km | μs | km | μs |
| 90 | 3.43 | 11.4 | 6.47 | 21.6 | 8.73 | 29.1 | 9.93 | 33.1 |
| 70 | — | | 3.04 | 10.1 | 5.30 | 17.7 | 6.50 | 21.7 |
| 50 | — | | — | | 2.26 | 7.53 | 3.46 | 11.5 |
| 30 | — | | — | | — | | 1.20 | 4.00 |

It is noted that only when satellite TRP 402 and satellite TRP 404 are at small elevation angles (e.g. 30° and 10° respectively) do the delay differences satisfy the requirement to be synchronized within a 6 μs CP duration. Moreover, a beam size of 10 km may be toward the lower end of what is feasible for satellite TRPs orbiting at 600 km, so the likelihood is that that larger beam sizes would be used in practical systems. Increasing the beam size in the calculation of the values in Table 1 however increases those values. There may therefore be relatively few scenarios in practical in systems in which multi-TRP communication may satisfy the requirement to be synchronized within a CP duration.

It will also be appreciated that because of the different angles that signals are received from satellite TRP 502 and satellite TRP 504 for a UE within beam footprint 506 (and because their orbits might not be perfectly circular) that the velocities of satellite TRP 502 and satellite TRP 504 relative to the UE may be different. This may lead to different Doppler shifts in frequency for signals originating at satellite TRP 502 and satellite TRP 504. Similarly to time synchronization, the degree of frequency alignment between signals from each TRP is a function of where in the beam footprint a UE receiving those signals is situated. Depending on a minimum degree of frequency alignment required by a UE to receive multi-TRP transmissions, signals received at some locations in the beam footprint may not be sufficiently frequency aligned, even if at other locations they are.

The present disclosure provides techniques for enabling multi-TRP transmission in an NTN. More specifically, the present disclosure provides techniques for UEs at different locations under the coverage of multiple satellite TRPs to communicate using multi-TRP by providing different timing and/or frequency sources for UEs in different areas within a beam footprint. Other techniques are also provided for a UE to process signals from multiple satellite TRPs independently.

Figure 6:
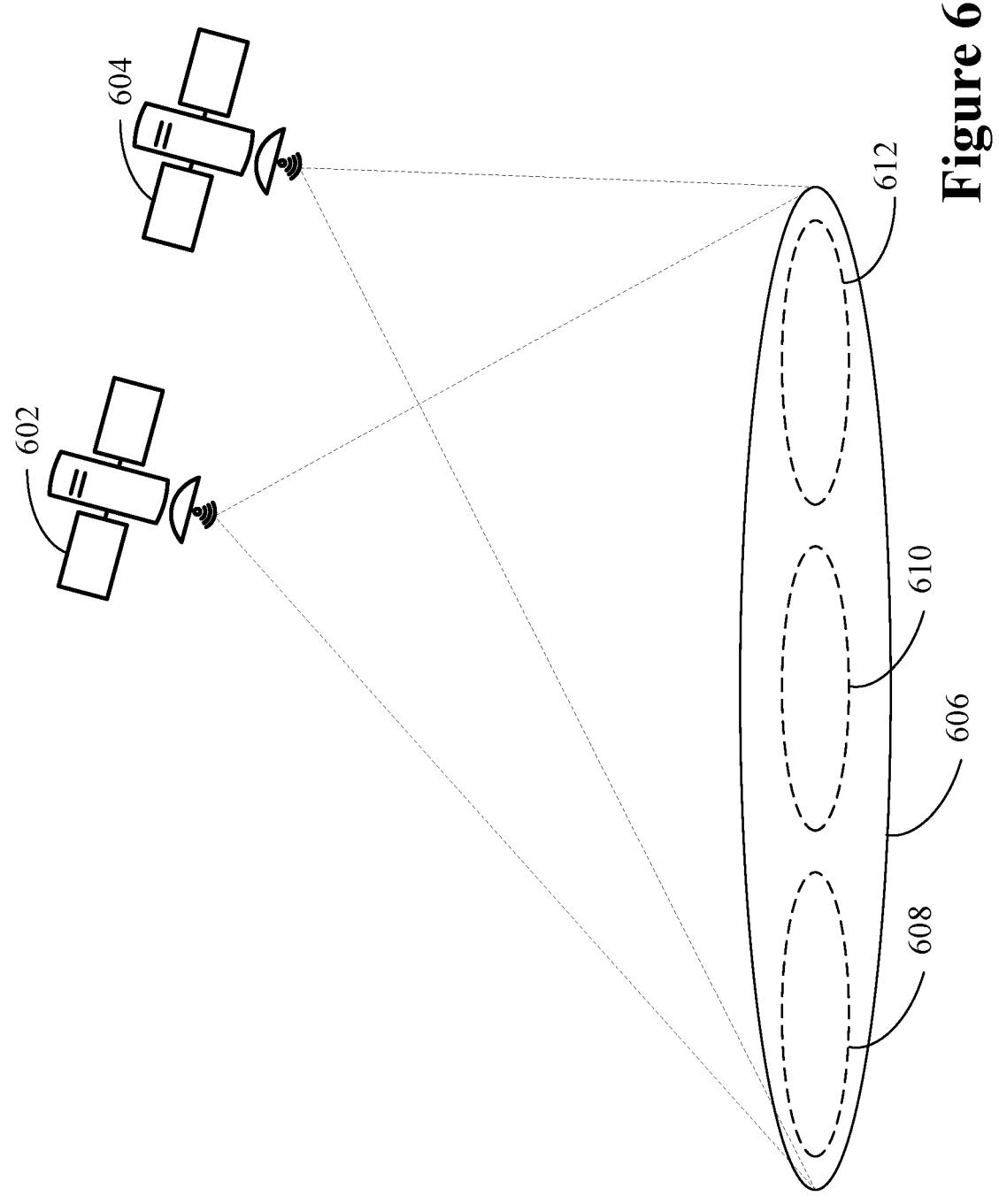
FIG. 6 shows an example portion of an NTN wireless communications system including a satellite for roll adjustments.

FIG. 6 illustrates satellite TRPs 602 and 604 configured to perform multi-TRP transmission for one or more UEs within the coverage of their beam footprint 606. The NTN may configure satellite TRPs 602 and 604 to transmit at different timings and/or frequencies such that UEs in subareas 608, 610 and 612 of footprint 606 are within a certain threshold of time synchronization and/or frequency alignment. For example, satellite TRP 602 may be configured to transmit at a first timing and satellite TRP 604 may be configured to transmit at a second timing such that UEs within subarea 608 receive the signals synchronized to within a threshold. Different respective timings of signals from each satellite TRP may be configured such that UEs in subareas 610 and 612 may also receive signals synchronized to within the threshold. The network may be agnostic as to the geographical location and extent of the subareas, and may instead simply define the subareas in terms of the timing and frequency values used by satellite TRP 602 and satellite TRP 604.

The timing and frequency values for each subarea 608, 610 and 612 may correspond to the timings and frequencies of reference signals transmitted from satellite TRP 602 and satellite TRP 604. For example, cell-defining SSBs from each of satellite TRP 602 and satellite TRP 604 may be transmitted such that the difference at the center of the beam footprint 606 is zero. This collective SSB as well as any quasi collocated (QCL) reference signals such as CSI-RS (e.g. tracking reference signals (TRS) or CSI-RS for tracking purposes) may be used as the QCL source for UEs in subarea 610. Separate reference signals (e.g. SSB or CSI-RS) may be configured to correspond to respective QCL sources for UEs in each of subareas 608 and 612. These reference signals may be equivalent to the cell-defining SSB except for a (time) delay component or frequency shift.

Configuring a UE to use the frequency and timing of a particular one of subareas 608, 610 or 612 can be achieved in a number of ways. For example, a UE may be equipped with a global navigation satellite system (GNSS) module (e.g. global positioning system (GPS)) such that the UE can determine its geographical location. After the UE has performed initial access to one of satellite TRP 602 and satellite TRP 604 (e.g. through the cell-defining SSB of that TRP), the UE may report its location to a network node, which may be either satellite TRP 602 or satellite TRP 604. The network may maintain a mapping of the timing and frequency corresponding to each subarea 608, 610 and 612 to the actual geographical area covered by those subareas, and thereby determine to which subarea the UE should be assigned based on its reported location.

The network node may transmit an indication of a timing and/or frequency of the assigned subarea to the UE. As part of, or subsequent to, the initial access procedure, the UE may have been provided with a list of subareas and their respective timing and frequency offsets with respect to the cell-defining SSB, for instance by preconfiguring the UE with a list of reference signals and corresponding time and frequency offsets. When the UE is preconfigured with a list of timing and frequency offsets with respect to the cell-defining SSB, the indication may take the form of an identifier of an item in the list. In other cases, the indication may comprise a timing and/or frequency value corresponding to a timing and/or frequency offset with respect to the cell-defining SSB.

Satellite TRP 602 and satellite TRP 604 may transmit reference signals corresponding to the indicated timing and/or frequency together with other control information or data for the UE. Those reference signals may be transmitted periodically for the UE to use as a QCL source and maintain time synchronization and frequency alignment with satellite TRP 602 and satellite TRP 604 for the duration of multi-TRP communication.

In another example, the UE may monitor the cell-defining SSB and/or QCLed reference signal (these may correspond to the timing and/or frequency of the central subarea 610, another subarea or an arbitrary point within the beam footprint 606) for each of satellite TRP 602 and satellite TRP 604, measure the time difference between them, and report the time difference to one or other of satellite TRP 602 and satellite TRP 604. Monitoring the cell-defining SSBs to measure the time difference may be advantageous because each satellite TRP may transmit cell-defining SSBs irrespective of multi-TRP transmission. Reference signal overhead can therefore be minimized. The measured time difference may be referred to as a reference signal time difference (RSTD) and may be reported in a MAC-control element (MAC-CE), in RRC signaling or some other methods (e.g. CSI feedback). In this example, the transmission comprising the reference signals from each satellite or other signaling from each satellite TRP may convey an identity of each satellite TRP to the UE such that the UE can determine which of satellite TRP 602 and satellite TRP 604 lags the other. For example, each satellite TRP may transmit respective sets of reference signals with different signatures, with the correspondence of the signature to the TRP either being known at the UE, or a rule for the sign of the time difference based on the signatures being by the UE and the NTN (i.e. a satellite TRP or gateway). The different signatures may comprise using different resources for reference signals from different TRPs. The different resources may themselves comprise different time resources, frequency resources, sequence resources or a combination thereof. In one specific example, the reference signals from each satellite TRP may occupy different resource elements. In another specific example, the reference signals from each satellite TRP may overlap in time, but the sequence for each of the reference signals could be different (e.g. TRP1 transmits a first reference signal, then a second, whereas TRP2 transmits the second reference signal then the first).

Similarly to the previous example, one of satellite TRP 602 and satellite TRP 604 may transmit an indication of a timing and/or frequency for the UE to use. The UE may have been preconfigured with a list of timing and frequency offsets with respect to the cell-defining SSB, for instance by preconfiguring the UE with a list of reference signals and corresponding time and frequency offsets. When the UE is preconfigured with a list of timing and frequency offsets with respect to the cell-defining SSB, the indication may take the form of an identifier of an item in the list. In other cases, the indication may comprise a timing and/or frequency value corresponding to a timing and/or frequency offset with respect to the cell-defining SSB. Satellite TRP 602 and satellite TRP 604 may transmit reference signals corresponding to the indicated timing and/or frequency together with other control information or data for the UE. Those reference signals may be transmitted periodically for the UE to use as a QCL source and maintain time synchronization and frequency alignment for the duration of multi-TRP communication.

To simplify operation, one of satellite TRP 602 and satellite TRP 604 may transmit reference signals at the same timing and/or frequency as the cell-defining SSB, and the other satellite TRP may adjust its timing and/or frequency such that the reference signals are received within a certain threshold of time synchronization and/or frequency alignment. This allows for only one of satellite TRP 602 and satellite TRP 604 to have to alter timing and/or frequency.

In a further example, instead of measuring a single time difference between respective reference signals from satellite TRP 602 and satellite TRP 604, each of satellite TRP 602 and satellite TRP 504 may be configured to transmit reference signals at timings and/or frequencies corresponding to the subareas 608, 610 and 612, and the UE may measure time differences between reference signals from satellite TRP 602 and satellite TRP 604 for each subarea. The UE may report the reference signals having a smallest timing difference from among the measured time differences. Alternatively, the UE may report the reference signal(s) received with a strongest quality (e.g. RSRP). One of satellite TRP 602 and satellite TRP 604 may transmit an indication of a timing and/or frequency for the UE to use. The UE may have been preconfigured with a list of timing and frequency offsets with respect to the cell-defining SSB, for instance by preconfiguring the UE with a list of reference signals and corresponding time and frequency offsets. When the UE is preconfigured with a list of timing and frequency offsets with respect to the cell-defining SSB, the indication may take the form of an identifier of an item in the list. In other cases, the indication may comprise a timing and/or frequency value corresponding to a timing and/or frequency offset with respect to the cell-defining SSB. Satellite TRP 602 and satellite TRP 604 may transmit reference signals corresponding to the indicated timing and/or frequency together with other control information or data for the UE. Those reference signals may be transmitted periodically for the UE to use as a QCL source and maintain time synchronization and frequency alignment for the duration of multi-TRP communication. The further example allows for a UE to merely signal a selection from a finite number of timing/frequency options, which may have a lower signaling overhead than examples where a UE signals a time difference (e.g. at high precision). The reduction in signaling overhead from the UE may reduce signaling overhead for the NTN even taking account of the increased reference signal overhead from the satellite TRPs.

When satellite TRP 602 and satellite TRP 604 serve multiple UEs using multi-TRP transmission, and those UEs are at different locations within beam footprint 606 (e.g. in different subareas 608, 610 or 612), the UEs will be communicating with satellite TRP 602 and satellite TRP 604 using different timings and/or frequency alignment. To serve the multiple UEs concurrently therefore, transmissions for UEs using different timings and/or frequency alignment may be TDMed or FDMed (although for FDM, large frequency separation or different transmitters may be required for different UEs). That is, the UEs may be grouped according to their timing and/or frequency, or subarea and transmissions for each group may be mapped to different time periods or frequency regions. When TDM is used, a gap may be configured between the different time periods to allow for satellite TRP 602 and satellite TRP 604 to adjust their timings and/or frequencies.

To support each of the above examples, a UE may receive signaling indicating ephemeris information for each of satellite TRP 602 and satellite TRP 504 from at least one of the satellite TRPs. The UE may also receive signaling indicating frequency pre-compensation information for each of the QCL sources (i.e. the reference signal timings and/or frequencies) of satellite TRP 602 and satellite TRP 604 from at least one of the satellite TRPs. For example, as part of an initial access procedure or subsequent thereto, for each satellite TRP that may potentially serve the UE, the UE may receive ephemeris information and frequency pre-compensation information for an SSB. If multiple SSBs are configured, the frequency pre-compensation information may include pre-compensation values for each SSB. The UE may further receive transmission configuration indicator (TCI) states indicating time and/or frequency offsets with respect to the timing and/or frequency of a corresponding SSB. The TCI states signaled may correspond to the reference signal timings and/or frequencies of the different subareas 608, 610, and 612.

It will be appreciated that although only three subareas are shown in FIG. 6, the number of subareas may be two, or four or more. The number of subareas configured may depend on the size of beam footprint 606 and the threshold synchronization required. For example, the number of subareas may be chosen to maximize the area of the beam footprint 606 covered by subareas such that UEs in the subareas may receive signals from the satellite TRPs within a certain threshold of time synchronization and/or frequency alignment (e.g. within a CP duration).

Figure 7:
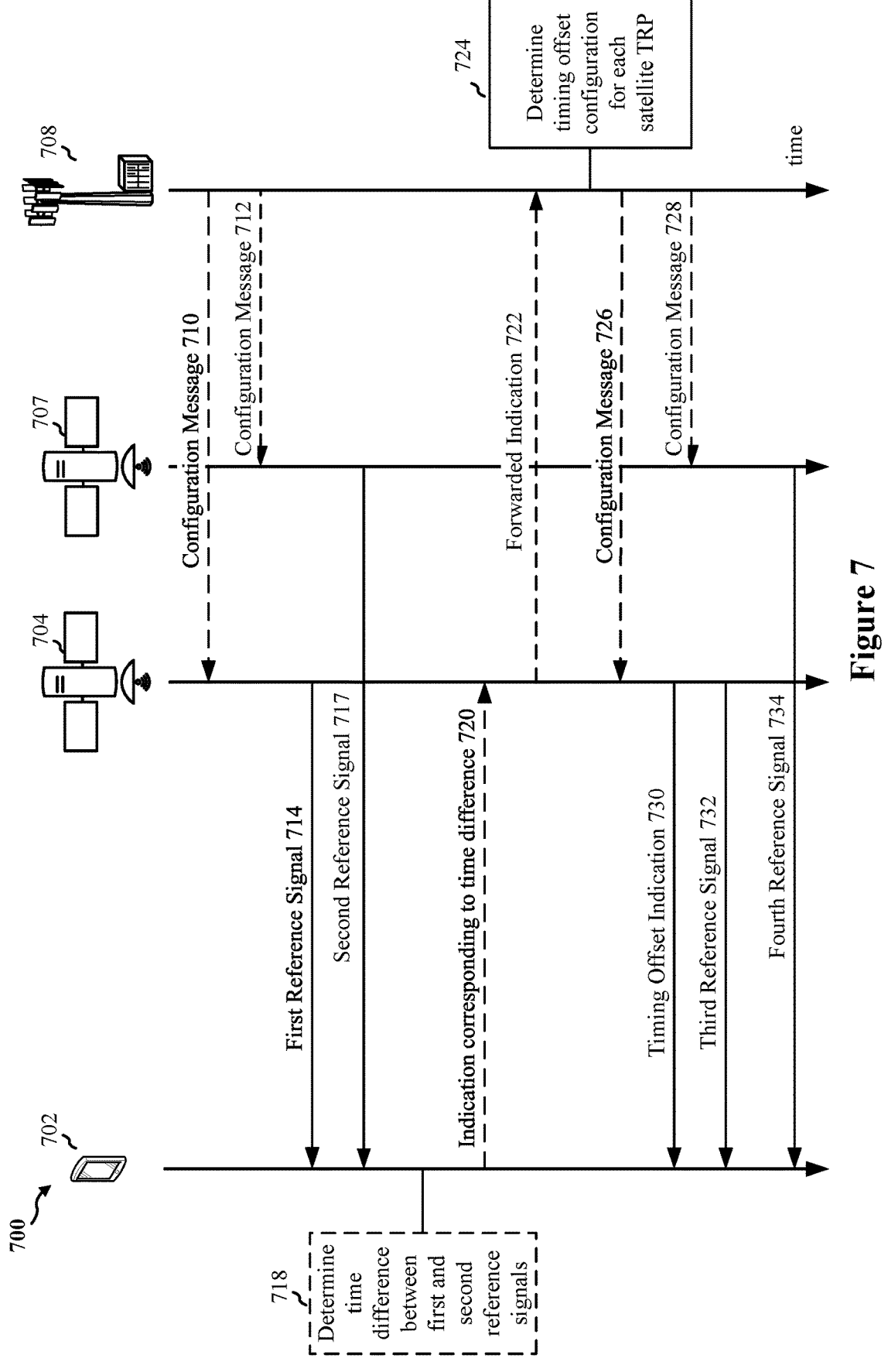
FIG. 7 shows a sequence diagram illustrating an example signal exchange between a gateway, satellite TRPs and a UE.

FIG. 7 is a sequence diagram illustrating a signaling exchange between a UE 702, satellite TRP 704, satellite TRP 706 and a gateway 708. The exchange may begin by the gateway 708 transmitting configuration message 710 to satellite TRP 704 and configuration message 712 to satellite TRP 706. These configuration messages may configure satellite TRP 704 and satellite TRP 706 for multi-TRP transmission to UEs. Such configuration may include configuring satellite TRP 704 and satellite TRP 706 so that their respective antenna weights allow for their beam footprints to align (e.g. to form a beam footprint 606), to share MAC and higher layer entities, and to perform the subsequent operations in the signaling exchange.

Satellite TRP 704 may transmit a first reference signal 714 and Satellite TRP 706 may transmit a second reference signal 716 to UE 702. The timing and frequencies of reference signals 714 and 716 may be configured so that at a certain geographical location within the coverage of satellite TRP 704 and satellite TRP 706 the reference signals are one or more of time synchronized and frequency aligned. Reference signals 714 and 716 may be cell-defining SSBs, non-cell-defining SSBs, CSI-RS, or demodulation reference signals (DMRS).

UE 702 may optionally determine 718 a time difference between the first reference signal 714 and the second reference signal 716. For example, the transmission comprising the reference signals from each satellite or other signaling from each satellite TRP may convey an identity of each satellite TRP to the UE such that the UE can determine which of satellite TRP 704 and satellite TRP 706 lags the other. The UE may then transmit an indication 720 corresponding to the time difference to satellite TRP 704, which may then forward it as a forwarded indication 722 to the gateway 708.

The gateway 708 may determine 724 a timing offset configuration for each satellite TRP 704 and 706 based on the time difference. For example, the gateway 708 may determine the timing and frequencies each satellite TRP 704 and 706 should transmit at (in accordance with the previous discussion, only one TRP need change its timing and/or frequency. The gateway 708 may configure each of satellite TRP 704 and 706 to transmit at timings and frequencies corresponding to one of a respective plurality of TCI states. The gateway 708 may transmit configuration message 726 to satellite TRP 704 and configuration message 728 to satellite TRP 706. The configuration messages may include indications of corresponding TCI states and a TDM or FDM scheme for multiplexing multi-TRP transmissions for UE 702 with other UEs.

Satellite TRP 704 may transmit a timing offset indication 730 to UE 602. The transmission comprising the indication may also convey time or frequency resources to use (and any switching gaps) for the TDM or FDM scheme.

Satellite TRP 704 may transmit a third reference signal 732 and Satellite TRP 706 may transmit a fourth reference signal 734 to UE 702 according to the timing offset configurations. The timing and frequencies of reference signals 732 and 734 may be configured so that the reference signals are one or more of time synchronized and frequency aligned at UE 702. Reference signals 732 and 734 may be cell-defining SSBs, non-cell-defining SSBs, CSI-RS, or demodulation reference signals (DMRS).

Figure 8:
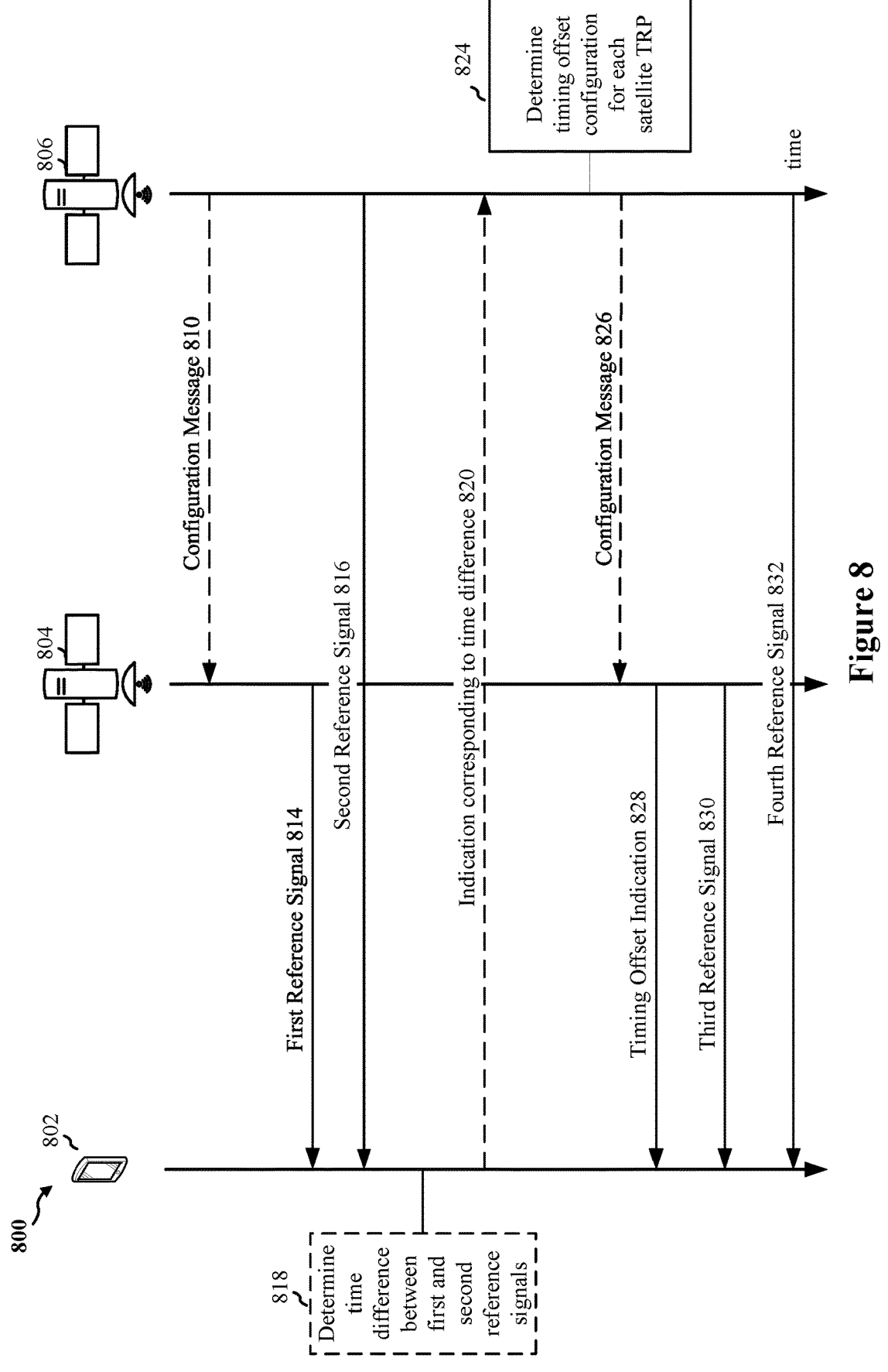
FIG. 8 shows a sequence diagram illustrating an example signal exchange between satellite TRPs and a UE.

FIG. 8 is a sequence diagram illustrating a signaling exchange between a UE 802, satellite TRP 804, and satellite TRP 806. The exchange may begin by satellite TRP 806 transmitting configuration message 810 to satellite TRP 804. These configuration messages may configure satellite TRP 804 for multi-TRP transmission to UEs. Such configuration may include configuring satellite TRP 804 and satellite TRP 806 so that their respective antenna weights allow for their beam footprints to align (e.g. to form a beam footprint 606), to share MAC and higher layer entities, and to perform the subsequent operations in the signaling exchange.

Satellite TRP 804 may transmit a first reference signal 814 and Satellite TRP 806 may transmit a second reference signal 816 to UE 802. The timing and frequencies of reference signals 814 and 816 may be configured so that at a certain geographical location within the coverage of satellite TRP 804 and satellite TRP 806 the reference signals are one or more of time synchronized and frequency aligned. Reference signals 814 and 816 may be cell-defining SSBs, non-cell-defining SSBs, CSI-RS, or demodulation reference signals (DMRS).

UE 802 may optionally determine 818 a time difference between the first reference signal 814 and the second reference signal 816. For example, the transmission comprising the reference signals from each satellite or other signaling from each satellite TRP may convey an identity of each satellite TRP to the UE such that the UE can determine which of satellite TRP 804 and satellite TRP 806 lags the other. The UE may then transmit an indication 820 corresponding to the time difference to satellite TRP 806.

Satellite TRP 806 may determine 824 a timing offset configuration for each satellite TRP 804 and 806 based on the time difference. For example, satellite TRP 806 may determine the timing and frequencies each satellite TRP 804 and 806 should transmit at (in accordance with the previous discussion, only one TRP need change its timing and/or frequency. Satellite TRP 806 may configure each of satellite TRP 804 and 806 to transmit at timings and frequencies corresponding to one of a respective plurality of TCI states.

Satellite TRP 806 may transmit configuration message 826 to satellite TRP 804. The configuration message may include an indication of a corresponding TCI state and a TDM or FDM scheme for multiplexing multi-TRP transmissions for UE 802 with other UEs.

Satellite TRP 704 (or satellite TRP 806) may transmit a timing offset indication 828 to UE 802. The transmission comprising the indication may also convey time or frequency resources to use (and any switching gaps) for the TDM or FDM scheme.

Satellite TRP 804 may transmit a third reference signal 830 and Satellite TRP 806 may transmit a fourth reference signal 832 to UE 802 according to the timing offset configurations. The timing and frequencies of reference signals 830 and 832 may be configured so that the reference signals are one or more of time synchronized and frequency aligned at UE 802. Reference signals 830 and 832 may be cell-defining SSBs, non-cell-defining SSBs, CSI-RS, or demodulation reference signals (DMRS).

In the examples discussed with regard to FIGS. 6, 7 and 8, there may be different ways that the satellite TRPs may reconfigure their transmitters to change the timing and/or frequency for different allocations. For example, satellite TRP 804 may reconfigure its transmitter between transmitting reference signal 814 and reference signal 830, or between transmissions for UEs associated with different QCL sources or subareas (e.g. subareas 608, 610, and 612). Different transmitter configurations may also be used in different frequency allocations.

In an OFDM system, the process used to adjust timing between different allocations may depend on the size of the timing adjustment required. Transmission in OFDM systems typically maps bit strings onto complex values that represent constellation points in the frequency domain. An inverse fast Fourier transform (IFFT) module is then used to convert those complex values into time domain samples to which a CP is added before transmission.

If the timing difference between allocations does not exceed the CP duration by a threshold amount (such a threshold amount may depend on an operating SINR), the timing adjustment may be implemented as a circular shift (e.g. by a phase ramp before the IFFT operation). This process is advantageous because it allows the satellite TRP to keep a constant IFFT cadence between allocations, and avoiding the need for guard intervals as it completely removes the risk that the different allocations may overlap. This reconfiguration method also allows FDM of users with different time pre-compensation (e.g. UEs in different subareas 608, 610 and 612).

If the time difference between allocations exceeds the threshold amount, the pre-compensation has to be done in the time domain. That is, after the IFFT operation. This reconfiguration method may use guard intervals between TDM allocations for users in different subareas.

Similar to the timing adjustment, if the frequency difference between allocations is small with respect to the subcarrier spacing (smaller than threshold that depends on the subcarrier spacing), the frequency adjustment may be achieved by applying a different phase rotation in each OFDM symbol. That is, before the IFFT operation. If the frequency difference between allocations is larger than the threshold, time-domain per-sample rotation.

A satellite TRP may improve efficiency by using a combination of pre-IFFT and post-IFFT timing or frequency adjustments. For example, the configured subareas may be grouped according to their timings and/or frequencies. Between allocations of the same group, pre-IFFT frequency or time adjustments may be made, and between allocations of different groups post-IFFT frequency or time adjustments may be made. The order of TDM allocations may be configured so that each allocation within a group are consecutive, to reduce the number of guard intervals required. Similarly, allocations within a group may be FDMed within a same TDM allocation to reduce the number of different TDM allocations required.

The solutions to enable multi-TRP in NTNs described in the present disclosure up to this point have focused on aligning in time and/or frequency signals received at a UE from multiple TRPs so that the UE can perform processing similar to terrestrial multi-TRP. An alternative is not to follow the assumptions of conventional systems, refrain from performing timing and/or frequency pre-compensation, and have a UE process signals from different satellite TRPs independently.

Considering a 2×2 MIMO transmission from two satellite TRPs with two transmission layers, one from each TRP, a comparison can be made of the channel estimation for synchronous operation, where timing and/or frequency pre-compensation is employed, and asynchronous operation, where timing and/or frequency pre-compensation is not.

For a UE operating synchronously and using a reference signal such as DMRS to estimate the channel from two ports corresponding to respective satellite TRPs, and assuming spatially white noise, the minimum mean square error (MMSE) filter may be:

$$W_S = \begin{bmatrix} h_1^H \\ h_2^H \end{bmatrix} \left[ h_1 h_1^H + h_2 h_2^H + \sigma^2 I \right]^{-1} \tag{1}$$

For a UE operating asynchronously, the interference of one satellite TRP on the other cannot be directly estimated from a reference signal such as DMRS without a delay or inter-TRP message exchange. Accordingly, the MMSE filter for one satellite TRP may be:

$$W_{A1} = h_1^H \left[ h_1 h_1^H + C \right]^{-1} \tag{2}$$

C is the estimated covariance matrix and is given by $$C = h_2 h_2^H + \sigma^2 I.$$

The MMSE filters for each type of operation are therefore equivalent.

The processing required by the UE to enable asynchronous reception requires consideration. Similar to the processing described above for a satellite TRP to transmit at different timings and/or frequencies, the processes used to receive signals from two satellite TRPs may depend on the size of the timing or frequency difference between the signals. If the timing difference does not exceed the CP duration by a threshold amount (such a threshold amount may depend on an operating SINR) or if the frequency difference between is small with respect to the subcarrier spacing, a single FFT (providing complementary functionality to the IFFT at a transmitter) unit per antenna can be employed. A UE operating asynchronously in multi-TRP in an NTN may frequently encounter large timing and frequency differences. Therefore, receiver design for asynchronous operation may be based on assuming larger differences requiring separate FFT units per antenna for each satellite TRP.

Figure 9A:
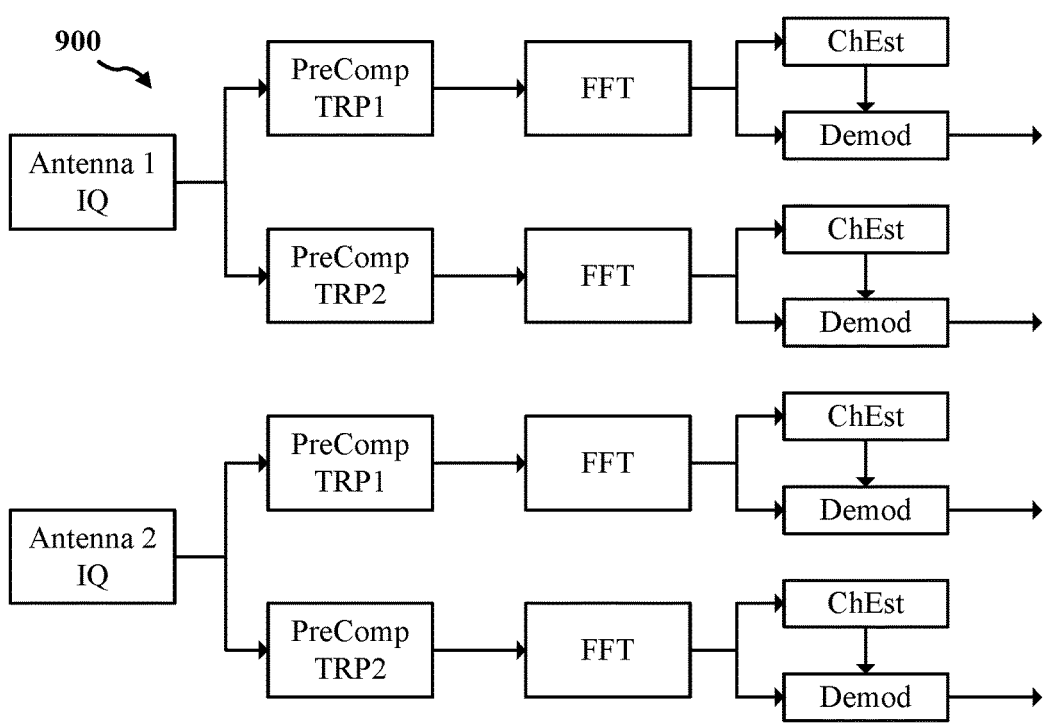
FIG. 9A is a diagram illustrating processing of IQ samples from two antennas of a receiver at a UE operating asynchronously.

FIG. 9A is a diagram illustrating processing of IQ samples from two antennas of a receiver at a UE operating asynchronously for 2×2 MIMO. IQ samples corresponding to transmissions from two satellite TRPs are received at antenna 1. Separate pre-compensation (i.e. frequency and timing adjustments) may be applied for each TRP and the output of each pre-compensation unit is input to a respective FFT unit. Part of the output of each FFT unit corresponds to reference signals from which a channel estimate can be extracted. This channel estimate will treat the signal from the other satellite TRP as interference and allow the FFT output to be demodulated as log-likelihood ratios (LLRs).

The same processing is performed for IQ samples received at antenna 2. The original data can then be reproduced by combining the LLRs according to the MIMO scheme. This approach uses 4 separate FFT units instead of the 2 that would be used in synchronous operation.

Figure 9B:
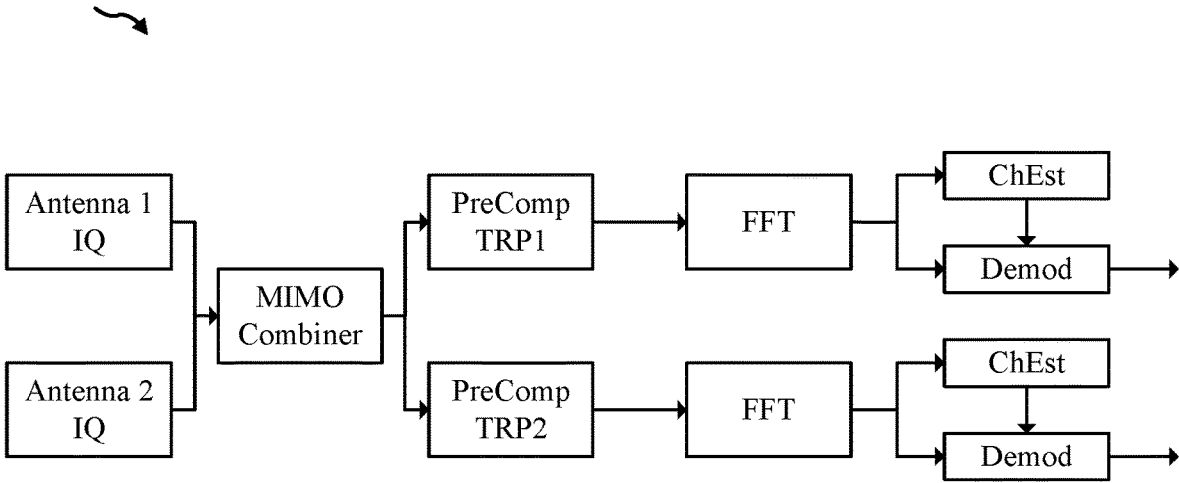
FIG. 9B is a diagram illustrating processing of IQ samples from two antennas of a receiver at a UE operating asynchronously.

FIG. 9B illustrates an alternative method of processing IQ samples from two antennas of a receiver at a UE operating asynchronously. If the channel is line-of-sight dominant, the signals from each satellite TRP may correspond to different sets of time domain samples. Accordingly, instead of the time domain samples from each antenna being output directly to pre-compensation units, the samples from each antenna may be output to a MIMO combiner that separates the samples from each TRP and outputs them to respective TRP pre-compensation units. The output of each pre-compensation unit is input to a respective FFT unit. Part of the output of each FFT unit corresponds to reference signals from which a channel estimate can be extracted to demodulate the FFT output corresponding to other signals.

This technique may use frequent reference signal transmission (such as CSI-RS for tracking purposes) to accurately estimate the channel. Even so, to estimate the full channel without trial and error, the UE may not process at least one slot of a first satellite TRP to improve the channel estimate from reference signals in a slot of a second satellite TRP, and then not process at least one slot of the second satellite TRP to improve the channel estimate from reference signals in a slot of the first satellite TRP. The full channel can be derived from both such channel estimates. Due to misalignment between slots, for every such measurement of one TRP, the UE may be required not to process two slots (the slot being measured may straddle two slots of the other TRP).

FIG. 10 is a flow diagram illustrating an example process 1000 for enabling multi-TRP transmission in a NTN, in accordance with various aspects of the present disclosure. The operations of process 900 may be performed by a UE such as UE 702 or 802.

In some aspects, process 1000 may include receiving a first reference signal from a first satellite transmission reception point (TRP) at a first timing (block 1010).

Process 1000 may further include receiving a second reference signal from a second satellite TRP at a second timing, wherein, at a first geographic location, the first timing is synchronized with the second timing (block 1020).

Optionally, process 1000 may include determining a first time difference between at least the first timing and the second timing (block 1030).

Optionally, process 1000 may include transmitting, to at least one of the first satellite TRP and the second satellite TRP, an indication corresponding to the first time difference (block 1040).

Process 1000 may further include receiving a third reference signal from the first satellite TRP at a third timing (block 1050).

Process 1000 may further include receiving a fourth reference signal from the second satellite TRP at a fourth timing, wherein the third timing and the fourth timing are synchronized at the UE (block 1060).

Process 1000 may further include receiving an indication of a timing offset of the fourth reference signal with respect to the second reference signal (block 070).

Process 1000 may further include using the third and fourth reference signals as a quasi colocation (QCL) source (block 1080).

FIG. 10 is a flow diagram illustrating an example process 1100 for enabling multi-TRP transmission in a NTN, in accordance with various aspects of the present disclosure. The operations of process 1000 may be performed by a network entity such as gateway 708 or satellite TRP 806.

In some aspects, process 1100 may include configuring a first satellite transmission reception point (TRP), to transmit a first reference signal to a first user equipment (UE) at a first timing (block 1110).

Process 1100 may further include configuring a second TRP, to transmit a second reference signal to the first UE at a second timing, wherein, the first timing is configured to be synchronized with the second timing at a first geographic location (block 1120).

Optionally, process 1100 may include receiving, from the first UE, an indication corresponding to a first time difference between the first and second reference signals at the first UE (block 1130).

Process 1100 may include configuring the first satellite TRP to transmit a third reference signal to the UE at a third timing (block 1140).

Process 1100 may further include configuring the second satellite TRP to transmit a fourth reference signal to the UE at a fourth timing, wherein the third timing and fourth timing frequency are synchronized at the UE (block 1150).

Process 1100 may further include configuring the first satellite TRP or the second satellite TRP to transmit an indication of a timing offset of the fourth reference signal with respect to the second reference signal (block 1160).

FIG. 12 is a flow diagram illustrating an example process 1200 for enabling multi-TRP transmission in a NTN, in accordance with various aspects of the present disclosure. The operations of process 1100 may be performed by a UE such as UE 702 or 802.

In some aspects, process 1200 may include receiving a first reference signal from a first satellite transmission reception point (TRP) at a first timing and first frequency (block 1210).

Process 1200 may further include receiving a second reference signal from a second satellite TRP at a second timing and second frequency, wherein, at a first geographic location, the first frequency is aligned with the second frequency (block 1220). The first reference signal and the second reference signal may each comprise a synchronization signal block (SSB) that defines a cell.

Optionally, process 1200 may include determining a first time difference between at least the first timing and the second timing (block 1230).

Optionally, process 1200 may include transmitting, to at least one of the first satellite TRP and the second satellite TRP, an indication corresponding to the first time difference (block 1240).

Process 1200 may further include receiving a third reference signal from the first satellite TRP at a third frequency (block 1250).

Process 1200 may further include receiving a fourth reference signal from the second satellite TRP at a fourth frequency, wherein the third frequency and the fourth frequency are aligned at the UE (block 1260). The third reference signal and fourth reference signal may each comprise a tracking reference signal (TRS), or a channel state information reference signal (CSI-RS) for tracking. The third frequency and fourth frequency may be aligned within a threshold frequency difference. The third frequency may be the same as the first frequency, and the fourth frequency may be different from the second frequency, with the difference between the fourth frequency and the second frequency being based on the first time difference.

Process 1200 may further include receiving an indication of a frequency offset of the fourth reference signal with respect to the second reference signal (block 1270).

Process 1200 may further include using the third and fourth reference signals as a quasi colocation (QCL) source (block 1280). For example, the UE may use third and fourth reference signals to maintain synchronization with the two or more satellite TRPs.

Optionally, the UE may receive an indication of a time resource in which the UE is to communicate. This time resource may be based on the first time difference When block 1230 and 1240 are performed, the method may further comprise receiving an indication of a frequency offset with respect to the first reference signal and receiving signaling indicating one of the first frequency or the frequency offset in response to transmitting the indication corresponding to the first time difference. the indication of the frequency offset may comprise a transmission configuration indicator (TCI) corresponding to the frequency offset. Transmitting the indication corresponding to the time difference may comprise transmitting a reference signal time difference (RSTD) that represents the first time difference.

When block 1230 and 1240 are performed, the method may also further comprise receiving an additional reference signal from the second satellite TRP at an additional frequency and determining a second time difference between the first reference signal and the additional reference signal. In such cases, the indication based on the first time difference may comprise an indication corresponding to the time difference that is smallest between the first time difference and a second time difference between the first reference signal and the additional reference signal. The third frequency may correspond to the first frequency and the fourth frequency corresponds to the second frequency or the additional frequency, whichever is associated with the smallest determined time difference.

FIG. 13 is a flow diagram illustrating an example process 1300 for enabling multi-TRP transmission in a NTN, in accordance with various aspects of the present disclosure. The operations of process 1300 may be performed by a network entity such as gateway 708 or satellite TRP 806.

In some aspects, process 1300 may include configuring a first satellite transmission reception point (TRP), to transmit a first reference signal to a first user equipment (UE) at a first frequency (block 1310).

Process 1300 may further include configuring a second TRP, to transmit a second reference signal to the first UE at a second frequency, wherein, the first frequency is configured to be aligned with the second frequency at a first geographic location (block 1320).

Optionally, process 1300 may include receiving, from the first UE, an indication corresponding to a first time difference between the first and second reference signals at the first UE (block 1330).

Process 1300 may include configuring the first satellite TRP to transmit a third reference signal to the UE at a third frequency (block 1340).

Process 1300 may further include configuring the second satellite TRP to transmit a fourth reference signal to the UE at a fourth frequency, wherein the third frequency and fourth frequency are aligned at the UE (block 1350). The third frequency may be the same as the first frequency, and the fourth frequency may be different from the second frequency, with the difference between the fourth frequency and the second frequency being based on the first time difference.

Configuring the first and second TRPs to transmit the third and fourth reference signals may comprise configuring two or more groups of UEs, each group corresponding to reference signals from the first and second satellite TRPs configured to be aligned in frequency at different geographic locations. In this case, the UEs may be assigned to the two or more groups of UEs based on an indication of a time difference for each UE (e.g. the first UE is assigned to one of the groups based on the first time difference. The UEs may then be communicated with by time division multiplexing the two or more groups of UEs.

In such examples, the network entity may assign UEs in each group into a plurality of sub-groups. The first and second TRPs are configured to transmit using different pre-inverse fast Fourier transform (IFFT) frequency adjustment for each sub-group.

In some examples, the first TRP is configured to transmit at the third frequency by performing an operation on a signal at the first frequency and the second TRP is configured to transmit at the fourth frequency by performing an operation on a signal at the second frequency. Each operation may comprise performing a phase rotation (i.e. a different phase rotation in each OFDM symbol) on the respective signal (i.e. the signal at the first frequency or the signal at the second frequency) before an inverse fast Fourier transform (IFFT). Alternatively, each operation may comprise performing a frequency adjustment (e.g. a per-sample phase rotation) on the respective signal after an IFFT. in a further alternative each operation may comprise both performing a phase rotation on the respective signal before an IFFT and performing a timing adjustment on the phase-rotated signal after the IFFT.

Process 1300 may further include configuring the first satellite TRP or the second satellite TRP to transmit an indication of a frequency offset of the fourth reference signal with respect to the second reference signal (block 1360). When block 1330 is performed, the method may further comprise configuring the second satellite TRP to transmit an additional reference signal at an additional frequency to the first UE. In such cases, the indication based on the first time difference may comprise an indication corresponding to the time difference that is smallest between the first time difference and a second time difference between the first reference signal and the additional reference signal. The third frequency may correspond to the first frequency and the fourth frequency corresponds to the second frequency or the additional frequency, whichever is associated with the smallest determined time difference.

FIG. 14 is a flow diagram illustrating an example process 1400 for enabling multi-TRP transmission in a NTN, in accordance with various aspects of the present disclosure.

The operations of process 1400 may be performed by a UE having a plurality of antennas.

In some aspects, process 1400 may include receiving a first reference signal from a first satellite transmission reception point (TRP) (block 1410).

Process 1400 may further include receiving a second reference signal from a second satellite TRP (block 1420).

Process 1400 may include determining frequency or time compensation factors for each of the first and second satellite TRPs respectively based on the first and second reference signals (block 1430).

Process 1400 may include receiving a communication from the first and second TRP at the plurality of antennas, wherein receiving the communication comprises performing a respective fast Fourier transform (FFT) and applying the respective frequency or time compensation factor before the respective FFT for each of the first and second satellite TRP (block 1440).

Receiving the communication may comprise performing the respective FFT and applying the respective frequency or time compensation factor before the respective FFT for each of the plurality of antennas. Alternatively, receiving the communication may comprise combining received signals from each antenna by a multiple-input multiple-output (MIMO) combiner to generate a separate stream of data for each of the two or more satellite transmission reception points. In this case, performing the respective FFT and applying the respective frequency or time compensation factor before the respective FFT for each of the two or more satellite transmission reception points comprises performing the respective FFT and applying the respective frequency or time compensation factor before the respective FFT on each separate stream of data. FIG. 15 depicts aspects of an example communications device 1500. In some aspects, communications device 1500 is a user equipment, such as UE 115 described above with respect to FIGS. 1 and 3, and UE 702 or 802 described above with respect to FIGS. 7 and 8.

The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes one or more processors 1520. In various aspects, the one or more processors 1520 may be representative of one or more of receive processor 358, transmit processor 364, TX MIMO processor 366, and/or controller/processor 380, as described with respect to FIG. 3. The one or more processors 1520 are coupled to a computer-readable medium/memory 1530 via a bus 1506. In certain aspects, the computer-readable medium/memory 1530 is configured to store instructions (e.g., computer-executable code) that when executed by the one or more processors 1520, cause the one or more processors 1520 to perform the method 1000 described with respect to FIG. 10, or any aspect related to it, including any additional steps or sub-steps described in relation to FIG. 10. Note that reference to a processor performing a function of communications device 1500 may include one or more processors performing that function of communications device 1500 in a distributed fashion.

In the depicted example, computer-readable medium/memory 1530 stores code (e.g., executable instructions) for receiving a first reference signal from a first satellite transmission reception point (TRP) at a first timing 1531, code for receiving a second reference signal from a second satellite TRP at a second timing 1532, code for receiving a third reference signal from the first satellite TRP at a third timing 1533, code for receiving a fourth reference signal from the second satellite TRP at a fourth timing, wherein the third timing and the fourth timing are synchronized at the UE 1534, code for receiving an indication of a timing offset of the fourth reference signal with respect to the second reference signal 1535, and code for using the third and fourth reference signals as a quasi colocation (QCL) source 1536. Processing of the code 1531-1536 may enable and cause the communications device 1500 to perform the method 1000 described with respect to FIG. 10, or any aspect related to it.

The one or more processors 1520 include circuitry configured to implement (e.g., execute) the code stored in the computer-readable medium/memory 1530, including circuitry for receiving a first reference signal from a first satellite transmission reception point (TRP) at a first timing 1521, circuitry for receiving a second reference signal from a second satellite TRP at a second timing 1522, circuitry for receiving a third reference signal from the first satellite TRP at a third timing 1523, circuitry for receiving a fourth reference signal from the second satellite TRP at a fourth timing, wherein the third timing and the fourth timing are synchronized at the UE 1524, circuitry for receiving an indication of a timing offset of the fourth reference signal with respect to the second reference signal 1525, and circuitry for using the third and fourth reference signals as a quasi colocation (QCL) source 1526. Processing with circuitry 1521-1526 May enable and cause the communications device 1500 to perform the method 1000 described with respect to FIG. 10, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1508 and/or antenna 1510 of the communications device 1500 in FIG. 15, and/or one or more processors 1520 of the communications device 1500 in FIG. 15. Means for communicating, receiving or obtaining may include the transceivers 354, antenna(s) 352, receive processor 358, and/or controller/processor 380 of the UE 104 illustrated in FIG. 3, transceiver 1508 and/or antenna 1510 of the communications device 1500 in FIG. 15, and/or one or more processors 1520 of the communications device 1500 in FIG. 15. Communications device 1500 may be modified to replace circuitry aspects 1521-1526 with circuitry aspects corresponding to the operations of FIG. 12 or 14 and to replace code aspects 1531-1536 wide code aspects corresponding to the operations of FIG. 12 or 14, or any aspect related to those figures, including any additional steps or sub-steps described in relation to FIG. 12 or 14. Such circuitry and code aspects may also be included in addition to circuitry aspects 1521-1526 and code aspects 1531-1536.

FIG. 16 depicts aspects of an example communications device. In some aspects, communications device 1600 is a network entity, such as BS 105 of FIG. 1, or a gateway 708 or satellite TRP 806 as discussed with respect to FIGS. 7 and 8.

The communications device 1600 includes a processing system 1602 coupled to a transceiver 1608 (e.g., a transmitter and/or a receiver) and/or a network interface 1612. The transceiver 1608 is configured to transmit and receive signals for the communications device 1600 via an antenna 1610, such as the various signals as described herein. The network interface 1612 is configured to obtain and send signals for the communications device 1600 via communications link(s), such as a backhaul link, midhaul link, and/or fronthaul link as described herein, such as with respect to FIG. 2. The processing system 1602 may be configured to perform processing functions for the communications device 1600, including processing signals received and/or to be transmitted by the communications device 1600.

The processing system 1602 includes one or more processors 1620. In various aspects, one or more processors 1620 may be representative of one or more of receive processor 338, transmit processor 320, TX MIMO processor 330, and/or controller/processor 340, as described with respect to FIG. 3. The one or more processors 1620 are coupled to a computer-readable medium/memory 1630 via a bus 1606. In certain aspects, the computer-readable medium/memory 1630 is configured to store instructions (e.g., computer-executable code), including code aspects 1631-1635, that when executed by the one or more processors 1620, cause the one or more processors 1620 to perform the method 1100 described with respect to FIG. 11, or any aspect related to it, including any additional steps or sub-steps described in relation to FIG. 11. Note that reference to a processor of communications device 1600 performing a function may include one or more processors of communications device 1600 performing that function in a distributed fashion.

In the depicted example, the computer-readable medium/memory 1630 stores code (e.g., executable instructions) for configuring a first satellite transmission reception point (TRP), to transmit a first reference signal to a first user equipment (UE) at a first timing 1631, code for configuring a second TRP, to transmit a second reference signal to the first UE at a second timing 1632, code for configuring the first satellite TRP to transmit a third reference signal to the UE at a third timing 1633, code for configuring the second satellite TRP to transmit a fourth reference signal to the UE at a fourth timing, wherein the third timing and fourth timing frequency are synchronized at the UE 1634, and code for configuring the first satellite TRP or the second satellite TRP to transmit an indication of a timing offset of the fourth reference signal with respect to the second reference signal 1635. Processing of the code 1631-1635 may enable and cause the communications device 1600 to perform the method 1100 described with respect to FIG. 11, or any aspect related to it.

The one or more processors 1620 include circuitry configured to implement (e.g., execute) the code stored in the computer-readable medium/memory 1630, including circuitry for configuring a first satellite transmission reception point (TRP), to transmit a first reference signal to a first user equipment (UE) at a first timing 1621, circuitry for configuring a second TRP, to transmit a second reference signal to the first UE at a second timing 1622, circuitry for configuring the first satellite TRP to transmit a third reference signal to the UE at a third timing 1623, circuitry for configuring the second satellite TRP to transmit a fourth reference signal to the UE at a fourth timing, wherein the third timing and fourth timing frequency are synchronized at the UE 1624, and circuitry for configuring the first satellite TRP or the second satellite TRP to transmit an indication of a timing offset of the fourth reference signal with respect to the second reference signal 1625. Processing with circuitry

1621-1625 May enable and cause the communications device 1600 to perform the method 1100 or 1300 as described with respect to FIG. 11 or 13, or any aspect related to those figures.

Various components of the communications device 1600 may provide means for performing the method 1100 as described with respect to FIG. 11, or any aspect related to it. Means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1608 and/or antenna 1610 of the communications device 1600 in FIG. 16, and/or one or more processors 1620 of the communications device 1600 in FIG. 16. Means for communicating, receiving or obtaining may include the transceivers 332, antenna(s) 334, receive processor 338, and/or controller/processor 340 of the BS 102 illustrated in FIG. 3, transceiver 1608 and/or antenna 1610 of the communications device 1600 in FIG. 16, and/or one or more processors 1620 of the communications device 1600 in FIG. 16. Communications device 1600 may be modified to replace circuitry aspects 1621-1625 with circuitry aspects corresponding to the operations of FIG. 13 and to replace code aspects 1631-1635 wide code aspects corresponding to the operations of FIG. 13, or any aspect related to it, including any additional steps or sub-steps described in relation to FIG. 13. Such circuitry and code aspects may also be included in addition to circuitry aspects 1621-1625 and code aspects 1631-1635.

The following provides an overview of aspects of the present disclosure:

Aspect 1: An apparatus for wireless communication a user equipment (UE), comprising: one or more processors coupled to memory, and configured to cause the UE to: receive a first reference signal from a first satellite transmission reception point (TRP) at a first timing; receive a second reference signal from a second satellite TRP at a second timing, wherein, at a first geographic location, the first timing is synchronized with the second timing; receive a third reference signal from the first satellite TRP at a third timing; receive a fourth reference signal from the second satellite TRP at a fourth timing, wherein the third timing and the fourth timing are synchronized at the UE; receive an indication of a timing offset of the fourth reference signal with respect to the second reference signal; and use the third and fourth reference signals as a quasi colocation (QCL) source.

Aspect 2: The apparatus of aspect 1, wherein the first reference signal and the second reference signal each comprises a synchronization signal block (SSB) that defines a cell.

Aspect 3: The apparatus of any of aspects 1 through 2, wherein the third reference signal and fourth reference signal each comprises a tracking reference signal (TRS), or a channel state information reference signal (CSI-RS) for tracking.

Aspect 4: The apparatus of any of aspects 1 through 3, wherein the third reference signal and fourth reference signal each comprises a tracking reference signal (TRS), or a channel state information reference signal (CSI-RS) for tracking.

Aspect 5: The apparatus of any of aspects 1 through 4, wherein the one or more processors are further configured to cause the UE to: determine a first time difference between at least the first timing and the second timing; and transmit, to at least one of the first satellite TRP and the second satellite TRP, an indication, wherein the indication is based on the first time difference.

Aspect 6: The apparatus of aspect 5, wherein the one or more processors are further configured to cause the UE to: receive an indication of a timing offset with respect to the first reference signal; and receive signaling indicating one of the first timing or the timing offset in response to transmitting the indication based on the first time difference.

Aspect 7: The apparatus of aspect 6, wherein the indication of the timing offset comprises a transmission configuration indicator (TCI) corresponding to the timing offset.

Aspect 8: The apparatus of any of aspects 5 through 7, wherein transmitting the indication based on the time difference comprises transmitting a reference signal time difference (RSTD) that represents the first time difference.

Aspect 9: The apparatus of any of aspects 5 through 8, wherein the at least one processor is further configured to cause the UE to: receive an additional reference signal from the second satellite TRP at an additional timing; and determine a second time difference between the first reference signal and the additional reference signal, wherein: the indication based on the first time difference comprises an indication corresponding to the time difference that is smallest between the first time difference and the second time difference; the third timing corresponds to the first timing; and the fourth timing corresponds to the second timing or the additional timing, whichever is associated with the smallest determined time difference.

Aspect 10: The apparatus of any of aspects 5 through 9, wherein the third timing is the same as the first timing, the fourth timing is different than the second timing, and a difference between the fourth timing and the second timing is based on the first time difference.

Aspect 11: The apparatus of any of aspects 1 through 10, wherein the one or more processors are further configured to cause the UE to: receive first ephemeris information for the first satellite TRP and second ephemeris information for the second satellite TRP; and receive first frequency compensation information for the first reference signal and second frequency compensation information for the second reference signal.

Aspect 12: The apparatus of any of aspects 1 through 11, wherein the one or more processors are further configured to cause the UE to receive an indication of a time resource in which the UE is to communicate, wherein the time resource is based on the first time difference.

Aspect 13: The apparatus of any of aspects 1 through 12, wherein the one or more processors are further configured to cause the UE to use the third and fourth reference signals to maintain synchronization with the two or more satellite TRPs.

Aspect 14: An apparatus for wireless communication by a network entity, comprising: one or more processors coupled to memory, and configured to cause the network entity to: configure a first satellite transmission reception point (TRP), to transmit a first reference signal to a first user equipment (UE) at a first timing; configure a second TRP, to transmit a second reference signal to the first UE at a second timing; configure the first satellite TRP to transmit a third reference signal to the UE at a third timing; and configure the second satellite TRP to transmit a fourth reference signal to the UE at a fourth timing, wherein the third timing and fourth timing frequency are synchronized at the UE; and configure the first satellite TRP or the second satellite TRP to transmit an indication of a timing offset of the fourth reference signal with respect to the second reference signal.

Aspect 15: The apparatus of aspect 14, wherein the one or more processors are further configured to cause the network entity to receive, from the first UE, an indication based on a first time difference between the first and second reference signals at the first UE.

Aspect 16: The apparatus of aspect 15, wherein the one or more processors are further configured to cause the network entity to: configure the second satellite TRP to transmit an additional reference signal at an additional timing to the first UE, wherein: the indication based on the first time difference comprises an indication corresponding to the time difference that is smallest between the first time difference and a second time difference between the first reference signal and the additional reference signal; the third timing corresponds to the first timing; and the fourth timing corresponds to the second timing or the additional timing, whichever is associated with the smallest determined time difference.

Aspect 17: The apparatus of any of aspects 14 through 16, wherein the one or more processors are further configured to cause the UE to use the third and fourth reference signals to maintain synchronization with the two or more satellite TRPs.

Aspect 18: The apparatus of any of aspects 14 through 17, wherein configuring the first and second TRPs to transmit the third and fourth reference signals comprises: configuring two or more groups of UEs, each group corresponding to reference signals from the first and second satellite TRPs configured to be synchronized with respect to time at different geographic locations; assigning UEs to the two or more groups of UEs based on an indication of a time difference for each UE, wherein the first UE is assigned to one of the groups based on the first time difference; and communicating with the UEs by time division multiplexing the two or more groups of UEs.

Aspect 19: The apparatus of aspect 18, wherein the one or more processors are further configured to cause the network entity to assign UEs in each group into a plurality of sub-groups, wherein the first and second TRPs are configured to transmit using different pre-inverse fast Fourier transform (IFFT) timing adjustment for each sub-group.

Aspect 20: The apparatus of any of aspects 14 through 19, wherein the first and second TRPs are configured to transmit at the third and fourth timing respectively by performing an operation on a signal at a reference timing, the reference timing for the third timing being the first timing and the reference timing for the fourth timing being the second timing, wherein the operation comprises: performing a circular shift on the signal at the reference timing before an inverse fast Fourier transform (IFFT); or performing a timing adjustment on the signal at the reference timing after an IFFT; or performing a circular shift on a signal at the timing of the respective reference signals before an IFFT and performing a timing adjustment on the circularly shifted signal after the IFFT.

Aspect 21: A method of wireless communication at user equipment (UE), comprising: receiving a first reference signal from a first satellite transmission reception point (TRP) at a first timing; receiving a second reference signal from a second satellite TRP at a second timing, receiving a third reference signal from the first satellite TRP at a third timing; receiving a fourth reference signal from the second satellite TRP at a fourth timing, wherein the third timing and the fourth timing are synchronized at the UE; receiving an indication of a timing offset of the fourth reference signal with respect to the second reference signal; and using the third and fourth reference signals as a quasi colocation (QCL) source.

Aspect 22: The method of aspect 21, wherein the indication of the timing offset comprises a transmission configuration indicator (TCI) corresponding to the timing offset.

Aspect 23: The method of any of aspects 21 through 22, further comprising: receiving first ephemeris information for the first satellite TRP and second ephemeris information for the second satellite TRP; and receiving first frequency compensation information for the first reference signal and second frequency compensation information for the second reference signal.

Aspect 24: The method of any of aspects 21 through 23, further comprising: determining a first time difference between at least the first timing and the second timing; transmitting, to at least one of the first satellite TRP and the second satellite TRP, an indication, wherein the indication is based on the first time difference.

Aspect 25: The method of aspect 24, further comprising: receiving an additional reference signal from the second satellite TRP at an additional timing; and determining a second time difference between the first reference signal and the additional reference signal, wherein: the indication based on the first time difference comprises an indication corresponding to the time difference that is smallest between the first time difference and the second time difference; the third timing corresponds to the first timing, whichever is associated with the smallest determined time difference; and the fourth timing corresponds to the second timing or the additional timing, whichever is associated with the smallest determined time difference.

Aspect 26: The method of any of aspects 21 through 25, wherein the third timing is the same as the first timing, the fourth timing is different from the second timing, and a difference between the fourth timing and the second timing is based on the time difference.

Aspect 27: The method of any of aspects 21 through 26, further comprising receiving an indication of a time resource in which the UE is to communicate, wherein the time resource is based on the first time difference.

Aspect 28: A method of wireless communication, comprising: configuring a first satellite transmission reception point (TRP), to transmit a first reference signal to a first user equipment (UE) at a first timing; configuring a second TRP, to transmit a second reference signal to the first UE at a second timing; configuring the first satellite TRP to transmit a third reference signal to the UE at a third timing; configuring the second satellite TRP to transmit a fourth reference signal to the UE at a fourth timing, wherein the third timing and fourth timing are synchronized at the UE; and configuring the first satellite TRP or the second satellite TRP to transmit an indication of a timing offset of the fourth reference signal with respect to the second reference signal.

Aspect 29: The method of aspect 28, wherein configuring the first and second satellite TRPs to transmit the third and fourth reference signals comprises: configuring two or more groups of UEs, each group corresponding to reference signals from the first and second satellite TRPs configured to be synchronized with respect to time at different geographic locations; assigning UEs to the two or more groups of UEs based on an indication of a time difference for each UE, wherein the first UE is assigned to one of the groups based on the first time difference; and communicating with the UEs by time division multiplexing the two or more groups of UEs.

Aspect 30: A method of wireless communication by a user equipment (UE) having a plurality of antennas, comprising: receiving a first reference signal from a first satellite transmission reception point (TRP); receiving a second reference signal from a second TRP; determining frequency or time compensation factors for each of the first and second satellite TRPs respectively based on the first and second reference signals; and receiving a communication from the first and second TRP at the plurality of antennas, wherein receiving the communication comprises performing a respective fast Fourier transform (FFT) and applying the respective frequency or time compensation factor before the respective FFT for each of the first and second satellite TRP.

Aspect 31: The method of aspect 30, wherein receiving the communication comprises: performing the respective fast Fourier transform (FFT) and applying the respective frequency or time compensation factor before the respective FFT for each of the plurality of antennas.

Aspect 32: The method of aspect 30, further comprising combining received signals from each antenna by a multiple-input multiple-output (MIMO) combiner to generate a separate stream of data for each of the two or more satellite transmission reception points, wherein performing the respective fast Fourier transform (FFT) and applying the respective frequency or time compensation factor before the respective FFT for each of the two or more satellite transmission reception points comprises performing the respective fast Fourier transform (FFT) and applying the respective frequency or time compensation factor before the respective FFT on each separate stream of data.

Aspect 33: A non-transitory computer-readable medium storing code for wireless communications at a UE, the code comprising instructions executable by a processor to perform a method of any of aspects 21 through 27 and 30 through 32.

Aspect 34: An apparatus for wireless communications at a UE, comprising at least one means for performing a method of any of aspects 21 through 27 and 30 through 32.

Aspect 35: A non-transitory computer-readable medium storing code for wireless communications at a satellite TRP or gateway, the code comprising instructions executable by a processor to perform a method of any of aspects 28 through 29.

Aspect 36: An apparatus for wireless communications at a satellite TRP or gateway, comprising at least one means for performing a method of any of aspects 28 through 29. The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising one or more processors, coupled to memory, and configured to cause the UE to:

receive a first reference signal from a first satellite transmission reception point (TRP) at a first timing;

receive a second reference signal from a second satellite TRP at a second timing, the first timing being is-synchronized with the second timing at a first geographic location;

transmit an indication corresponding to a time difference between the first reference signal and the second reference signal;

receive a third reference signal from the first satellite TRP at a third timing;

receive a fourth reference signal from the second satellite TRP at a fourth timing, the third timing and the fourth timing being synchronized at the UE based on the time difference;

receive an indication of a timing offset of the fourth reference signal with respect to the second reference signal; and use the third and fourth reference signals as a quasi colocation (QCL) source, wherein the time difference between the first reference signal and the second reference signal is a first time difference, and wherein the one or more processors are further configured to cause the UE to:

receive an additional reference signal from the second satellite TRP at an additional timing; and determine a second time difference between the first reference signal and the additional reference signal, wherein:

the indication corresponding to the time difference is indicative of the first time difference based on the first time difference being smaller than the second time difference;

the third timing corresponds to the first timing; and the fourth timing corresponds to the second timing instead of to the additional timing, based on the second timing being associated with the smaller of the first time difference and the second time difference.

2. The apparatus of claim 1, wherein the first reference signal and the second reference signal each comprises a synchronization signal block (SSB) that defines a cell.

3. The apparatus of claim 2, wherein the third reference signal and fourth reference signal each comprises a tracking reference signal (TRS), or a channel state information reference signal (CSI-RS) for tracking.

4. The apparatus of claim 1, wherein the third timing and fourth timing are synchronized at the UE to within a cyclic prefix of an orthogonal frequency division multiplexing (OFDM) symbol.

5. The apparatus of claim 1, wherein the one or more processors are further configured to cause the UE to:

receive an indication of a timing offset with respect to the first reference signal; and receive signaling indicating one of the first timing or the timing offset in response to transmitting the indication corresponding to the time difference.

6. The apparatus of claim 5, wherein the indication of the timing offset comprises a transmission configuration indicator (TCI) corresponding to the timing offset.

7. The apparatus of claim 5, wherein the one or more processors are further configured to cause the UE to:

receive first ephemeris information for the first satellite TRP and second ephemeris information for the second satellite TRP; and receive first frequency compensation information for the first reference signal and second frequency compensation information for the second reference signal.

8. The apparatus of claim 1, wherein to transmit the indication based on the time difference, the one or more processors are configured to cause the UE to transmit a reference signal time difference (RSTD) that represents the time difference.

9. The apparatus of claim 1, wherein:

the third timing is the same as the first timing, the fourth timing is different than the second timing, and a difference between the fourth timing and the second timing is based on the time difference.

10. The apparatus of claim 1, wherein the one or more processors are further configured to cause the UE to receive an indication of a time resource in which the UE is to communicate, wherein the time resource is based on the time difference.

11. The apparatus of claim 1, wherein the one or more processors are further configured to cause the UE to use the third and fourth reference signals to maintain synchronization with the first and second satellite TRPs.

12. An apparatus for wireless communication by a network entity, comprising:

one or more processors, coupled to memory, configured to cause the network entity to:

configure a first satellite transmission reception point (TRP), to transmit a first reference signal to a first user equipment (UE) at a first timing;

configure a second satellite TRP, to transmit a second reference signal to the first UE at a second timing;

obtain, from the UE, an indication corresponding to a time difference between the first reference signal and the second reference signal;

configure the first satellite TRP to transmit a third reference signal to the UE at a third timing; and configure the second satellite TRP to transmit a fourth reference signal to the UE at a fourth timing, wherein the third timing and fourth timing are synchronized at the UE based on the time difference; and configure the first satellite TRP or the second satellite TRP to transmit an indication of a timing offset of the fourth reference signal with respect to the second reference signal, wherein the time difference is a first time difference, and wherein the one or more processors are further configured to cause the network entity to:

configure the second satellite TRP to transmit an additional reference signal at an additional timing to the first UE, wherein:

the indication corresponding to the time difference is indicative of the first time difference based on the first time difference being smaller than a second time difference between the first reference signal and the additional reference signal;

the third timing corresponds to the first timing; and the fourth timing corresponds to the second timing instead of to the additional timing, based on the second timing being associated with the smaller of the first time difference and the second time difference.

13. The apparatus of claim 12, wherein:

the third timing is the same as the first timing, the fourth timing is different than the second timing, and a difference between the fourth timing and the second timing is based on the time difference.

14. The apparatus of claim 12, wherein, to configure the first and second TRPs to transmit the third and fourth reference signals, the one or more processors are configured to cause the network entity to:

configure two or more groups of UEs, each group corresponding to reference signals from the first and second satellite TRPs configured to be synchronized with respect to time at different geographic locations;

assign UEs to the two or more groups of UEs based on respective time difference indications for each UE, wherein the first UE is assigned to one of the groups based on the time difference between the first reference signal and the second reference signal; and communicate with the UEs by time division multiplexing the two or more groups of UEs.

15. The apparatus of claim 14, wherein the one or more processors are further configured to cause the network entity to assign UEs in each group into a plurality of sub-groups, the first and second TRPs being configured to transmit using different pre-inverse fast Fourier transform (IFFT) timing adjustment for each sub-group.

16. The apparatus of claim 12, the first and second TRPs being configured to transmit at the third and fourth timing respectively by performance of an operation on a signal at a reference timing, the reference timing for the third timing being the first timing and the reference timing for the fourth timing being the second timing, wherein the operation comprises:

performance of a circular shift on the signal at the reference timing before an inverse fast Fourier transform (IFFT); or performance of a timing adjustment on the signal at the reference timing after an IFFT; or performance of a circular shift on a signal at the timing of the respective reference signals before an IFFT and performing a timing adjustment on the circularly shifted signal after the IFFT.

17. A method of wireless communication at user equipment (UE), comprising:

receiving a first reference signal from a first satellite transmission reception point (TRP) at a first timing;

receiving a second reference signal from a second satellite TRP at a second timing, the first timing being is-synchronized with the second timing at a first geographic location;

transmitting an indication corresponding to a time difference between the first reference signal and the second reference signal;

receiving a third reference signal from the first satellite TRP at a third timing;

receiving a fourth reference signal from the second satellite TRP at a fourth timing, the third timing and the fourth timing being synchronized at the UE based on the time difference;

receiving an indication of a timing offset of the fourth reference signal with respect to the second reference signal; and using the third and fourth reference signals as a quasi colocation (QCL) source, wherein the time difference between the first reference signal and the second reference signal is a first time difference, and wherein the method further comprises:

receiving an additional reference signal from the second satellite TRP at an additional timing; and determining a second time difference between the first reference signal and the additional reference signal, wherein:

the indication corresponding to the time difference is indicative of the first time difference based on the first time difference being smaller than the second time difference;

the third timing corresponds to the first timing; and the fourth timing corresponds to the second timing instead of to the additional timing, based on the second timing being associated with the smaller of the first time difference and the second time difference.

18. A method of wireless communication, comprising:

configuring a first satellite transmission reception point (TRP), to transmit a first reference signal to a first user equipment (UE) at a first timing;

configuring a second satellite TRP, to transmit a second reference signal to the first UE at a second timing;

obtaining, from the UE, an indication corresponding to a time difference between the first reference signal and the second reference signal;

configuring the first satellite TRP to transmit a third reference signal to the UE at a third timing;

configuring the second satellite TRP to transmit a fourth reference signal to the UE at a fourth timing, wherein the third timing and fourth timing are synchronized at the UE based on the time difference; and configuring the first satellite TRP or the second satellite TRP to transmit an indication of a timing offset of the fourth reference signal with respect to the second reference signal, wherein the time difference is a first time difference, and wherein the method further comprises:

configuring the second satellite TRP to transmit an additional reference signal at an additional timing to the first UE, wherein:

the indication corresponding to the time difference is indicative of the first time difference based on the first time difference being smaller than a second time difference between the first reference signal and the additional reference signal;

the third timing corresponds to the first timing; and the fourth timing corresponds to the second timing instead of to the additional timing, based on the second timing being associated with the smaller of the first time difference and the second time difference.

* * * * *